(12) United States Patent
Tang et al.

(10) Patent No.: US 12,231,398 B2
(45) Date of Patent: *Feb. 18, 2025

(54) PER-NAMESPACE IP ADDRESS MANAGEMENT METHOD FOR CONTAINER NETWORKS

(71) Applicant: VMware LLC, Palo Alto, CA (US)

(72) Inventors: Qiang Tang, Beijing (CN); Zhaoqian Xiao, Beijing (CN)

(73) Assignee: VMware LLC, Palo Alto, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 17/684,160

(22) Filed: Mar. 1, 2022

(65) Prior Publication Data

US 2023/0231741 A1    Jul. 20, 2023

(30) Foreign Application Priority Data

Jan. 14, 2022  (WO) ................ PCT/CN2022/071987
Jan. 14, 2022  (WO) ................ PCT/CN2022/071988

(51) Int. Cl.
*H04L 61/5061*    (2022.01)
*G06F 9/455*     (2018.01)
(Continued)

(52) U.S. Cl.
CPC ...... *H04L 61/5061* (2022.05); *G06F 9/45558* (2013.01); *H04L 12/4633* (2013.01);
(Continued)

(58) Field of Classification Search
CPC ............. H04L 61/5061; H04L 12/4633; H04L 12/4641; H04L 12/66; H04L 49/70;
(Continued)

(56) References Cited

U.S. PATENT DOCUMENTS

| 6,697,360 B1 | 2/2004 | Gai et al. |
| 7,869,439 B1 | 1/2011 | Ramberg et al. |

(Continued)

FOREIGN PATENT DOCUMENTS

| AU | 2004227600 B2 | 5/2009 |
| CA | 3107455 A1 | 2/2020 |

(Continued)

OTHER PUBLICATIONS

Author Unknown, "Advanced Networking Features in Kubernetes and Container Bare Metal," Document 606835-001, Dec. 2018, 42 pages, Intel Corporation.

(Continued)

*Primary Examiner* — Obaidul Huq
(74) *Attorney, Agent, or Firm* — Quarles & Brady LLP

(57) ABSTRACT

Some embodiments of the invention provide a method of sending data in a network that includes multiple worker nodes, each worker node executing at least one set of containers, a gateway interface, and a virtual local area network (VLAN) tunnel interface. The method configures the gateway interface of each worker node to associate the gateway interface with multiple subnets. Each subnet is associated with a namespace, a first worker node executes a first set of containers of a first namespace, and a second worker node executes a second set of containers of the first namespace and a third set of containers of a second namespace. The method sends data between the first set of containers and the second set of containers through a VLAN tunnel between the first and second worker nodes.

18 Claims, 11 Drawing Sheets

(51) Int. Cl.
  *H04L 12/46*       (2006.01)
  *H04L 12/66*       (2006.01)
  *H04L 49/00*       (2022.01)
  *H04L 61/2592*     (2022.01)
  *H04L 67/133*      (2022.01)

(52) U.S. Cl.
  CPC .......... *H04L 12/4641* (2013.01); *H04L 12/66* (2013.01); *H04L 49/70* (2013.01); *H04L 61/2592* (2013.01); *H04L 67/133* (2022.05); *G06F 2009/45595* (2013.01)

(58) Field of Classification Search
  CPC .............. H04L 61/2592; H04L 67/133; H04L 12/4625; H04L 61/5007; G06F 9/45558; G06F 2009/45595
  USPC ................................................ 370/241, 252
  See application file for complete search history.

(56) References Cited

U.S. PATENT DOCUMENTS

| | | |
|---|---|---|
| 7,890,543 B2 | 2/2011 | Hunt et al. |
| 7,912,955 B1 | 3/2011 | Machiraju et al. |
| 8,627,442 B2 | 1/2014 | Ji et al. |
| 8,683,560 B1 | 3/2014 | Brooker et al. |
| 9,152,803 B2 | 10/2015 | Biswas et al. |
| 9,225,638 B2 | 12/2015 | Jain et al. |
| 9,258,312 B1 | 2/2016 | O'Neill et al. |
| 9,531,590 B2 | 12/2016 | Jain et al. |
| 9,536,077 B2 | 1/2017 | Bignon et al. |
| 9,590,901 B2 | 3/2017 | Tubaltsev et al. |
| 9,594,546 B1 | 3/2017 | Todd et al. |
| 9,674,275 B1 | 6/2017 | Engers et al. |
| 9,755,898 B2 | 9/2017 | Jain et al. |
| 9,774,537 B2 | 9/2017 | Jain et al. |
| 9,813,509 B1 | 11/2017 | Visser et al. |
| 9,825,810 B2 | 11/2017 | Jain et al. |
| 9,935,827 B2 | 4/2018 | Jain et al. |
| 9,979,641 B2 | 5/2018 | Jain et al. |
| 10,095,669 B1 | 10/2018 | Karppanen |
| 10,122,735 B1 | 11/2018 | Wohlgemuth |
| 10,129,077 B2 | 11/2018 | Jain et al. |
| 10,135,737 B2 | 11/2018 | Jain et al. |
| 10,193,977 B2 | 1/2019 | Ke et al. |
| 10,205,701 B1 | 2/2019 | Voss et al. |
| 10,225,137 B2 | 3/2019 | Jain et al. |
| 10,257,095 B2 | 4/2019 | Jain et al. |
| 10,270,796 B1 | 4/2019 | Veeraswamy et al. |
| 10,320,679 B2 | 6/2019 | Jain et al. |
| 10,341,233 B2 | 7/2019 | Jain et al. |
| 10,496,605 B2 | 12/2019 | Melnik et al. |
| 10,516,568 B2 | 12/2019 | Jain et al. |
| 10,547,521 B1 | 1/2020 | Roy et al. |
| 10,594,743 B2 | 3/2020 | Hong et al. |
| 10,609,091 B2 | 3/2020 | Hong et al. |
| 10,613,888 B1 | 4/2020 | Mentz et al. |
| 10,628,144 B2 | 4/2020 | Myneni et al. |
| 10,652,143 B2 | 5/2020 | Ravinoothala et al. |
| 10,693,782 B2 | 6/2020 | Jain et al. |
| 10,708,368 B1 | 7/2020 | Young et al. |
| 10,725,836 B2 | 7/2020 | Savenkov et al. |
| 10,795,909 B1 | 10/2020 | Bond et al. |
| 10,812,337 B2 | 10/2020 | Vaidya et al. |
| 10,841,226 B2 | 11/2020 | Mariappan et al. |
| 10,860,444 B2 | 12/2020 | Natanzon |
| 10,942,788 B2 | 3/2021 | Palavalli et al. |
| 10,944,691 B1 | 3/2021 | Raut et al. |
| 10,951,661 B1 | 3/2021 | Medan et al. |
| 10,972,341 B2 | 4/2021 | Mudigonda |
| 10,972,386 B2 | 4/2021 | Mackie et al. |
| 11,074,091 B1 | 7/2021 | Nayakbomman et al. |
| 11,086,700 B2 | 8/2021 | Myneni et al. |
| 11,159,366 B1 | 10/2021 | Gawade et al. |
| 11,190,491 B1 | 11/2021 | Kaciulis et al. |
| 11,194,483 B1 | 12/2021 | Dontu et al. |
| 11,277,309 B2 | 3/2022 | Vaidya et al. |
| 11,316,822 B1 | 4/2022 | Gawade et al. |
| 11,436,057 B2 | 9/2022 | Shen et al. |
| 11,500,688 B2 | 11/2022 | Liu et al. |
| 11,570,146 B2 | 1/2023 | Liu et al. |
| 11,606,254 B2 | 3/2023 | Liu et al. |
| 11,671,400 B2 | 6/2023 | Zhou et al. |
| 11,671,401 B2 | 6/2023 | Singh et al. |
| 11,689,425 B2 | 6/2023 | Vaidya et al. |
| 11,689,497 B2 | 6/2023 | Shen et al. |
| 11,748,170 B2 | 9/2023 | Palavalli et al. |
| 2004/0098154 A1 | 5/2004 | McCarthy |
| 2005/0129019 A1 | 6/2005 | Cheriton |
| 2007/0244962 A1 | 10/2007 | Laadan et al. |
| 2007/0245334 A1 | 10/2007 | Nieh et al. |
| 2010/0149996 A1 | 6/2010 | Sun |
| 2010/0177674 A1 | 7/2010 | Aggarwal |
| 2010/0211815 A1 | 8/2010 | Mankovskii et al. |
| 2010/0246545 A1 | 9/2010 | Berzin |
| 2010/0293378 A1 | 11/2010 | Xiao et al. |
| 2011/0161988 A1 | 6/2011 | Kashyap |
| 2011/0194494 A1 | 8/2011 | Aso et al. |
| 2011/0282936 A1 | 11/2011 | Chekhanovskiy et al. |
| 2011/0289508 A1 | 11/2011 | Fell et al. |
| 2012/0117226 A1 | 5/2012 | Tanaka et al. |
| 2012/0150912 A1 | 6/2012 | Ripberger |
| 2012/0304275 A1 | 11/2012 | Ji et al. |
| 2013/0018994 A1 | 1/2013 | Flavel et al. |
| 2013/0019314 A1 | 1/2013 | Ji et al. |
| 2013/0125230 A1 | 5/2013 | Koponen et al. |
| 2013/0174168 A1 | 7/2013 | Abuelsaad et al. |
| 2013/0266019 A1 | 10/2013 | Qu et al. |
| 2013/0283339 A1 | 10/2013 | Biswas et al. |
| 2014/0036730 A1 | 2/2014 | Nellikar et al. |
| 2014/0129690 A1 | 5/2014 | Jaisinghani et al. |
| 2014/0164897 A1 | 6/2014 | Yucel et al. |
| 2014/0223556 A1 | 8/2014 | Bignon et al. |
| 2014/0237100 A1 | 8/2014 | Cohn et al. |
| 2014/0258479 A1 | 9/2014 | Tenginakai et al. |
| 2015/0063166 A1 | 3/2015 | Sif et al. |
| 2015/0081767 A1 | 3/2015 | Evens |
| 2015/0100704 A1 | 4/2015 | Davie et al. |
| 2015/0172093 A1 | 6/2015 | Kaneko et al. |
| 2015/0222598 A1 | 8/2015 | Koponen et al. |
| 2015/0249574 A1 | 9/2015 | Zhang |
| 2015/0263899 A1 | 9/2015 | Tubaltsev et al. |
| 2015/0263946 A1 | 9/2015 | Tubaltsev et al. |
| 2015/0317169 A1 | 11/2015 | Sinha et al. |
| 2015/0348044 A1 | 12/2015 | Smith |
| 2015/0379281 A1 | 12/2015 | Feroz et al. |
| 2016/0036860 A1 | 2/2016 | Xing et al. |
| 2016/0080422 A1 | 3/2016 | Belgodere et al. |
| 2016/0094454 A1 | 3/2016 | Jain et al. |
| 2016/0094457 A1 | 3/2016 | Jain et al. |
| 2016/0094650 A1 | 3/2016 | Rio |
| 2016/0094661 A1 | 3/2016 | Jain et al. |
| 2016/0182293 A1 | 6/2016 | Benedetto et al. |
| 2016/0217301 A1 | 7/2016 | Watanabe et al. |
| 2016/0239326 A1 | 8/2016 | Kaplan et al. |
| 2016/0241436 A1 | 8/2016 | Fourie et al. |
| 2016/0254964 A1 | 9/2016 | Benc |
| 2016/0269318 A1 | 9/2016 | Su et al. |
| 2016/0294612 A1 | 10/2016 | Ravinoothala et al. |
| 2016/0315809 A1 | 10/2016 | McMurry et al. |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |
| 2017/0063782 A1 | 3/2017 | Jain et al. |
| 2017/0085561 A1 | 3/2017 | Han et al. |
| 2017/0093790 A1 | 3/2017 | Banerjee et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |

(56) References Cited

U.S. PATENT DOCUMENTS

| | | |
|---|---|---|
| 2017/0258479 A1 | 9/2017 | Hänni et al. |
| 2017/0286698 A1 | 10/2017 | Shetty et al. |
| 2017/0317954 A1 | 11/2017 | Masurekar et al. |
| 2017/0324781 A1 | 11/2017 | Hu et al. |
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0019969 A1 | 1/2018 | Murthy |
| 2018/0063194 A1 | 3/2018 | Vaidya et al. |
| 2018/0083835 A1 | 3/2018 | Cole et al. |
| 2018/0089299 A1 | 3/2018 | Collins et al. |
| 2018/0114012 A1 | 4/2018 | Sood et al. |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167458 A1 | 6/2018 | Ould-Brahim et al. |
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0234459 A1 | 8/2018 | Kung et al. |
| 2018/0248827 A1 | 8/2018 | Scharber et al. |
| 2018/0262424 A1 | 9/2018 | Roeland et al. |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0020684 A1* | 1/2019 | Qian ................... H04L 63/205 |
| 2019/0034237 A1 | 1/2019 | Siddappa et al. |
| 2019/0036868 A1 | 1/2019 | Chandrashekhar et al. |
| 2019/0042518 A1 | 2/2019 | Marolia et al. |
| 2019/0068500 A1 | 2/2019 | Hira |
| 2019/0068544 A1 | 2/2019 | Hao et al. |
| 2019/0079751 A1 | 3/2019 | Foskett et al. |
| 2019/0097879 A1 | 3/2019 | Cai et al. |
| 2019/0102280 A1 | 4/2019 | Caldato et al. |
| 2019/0103992 A1 | 4/2019 | Cidon et al. |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1 | 6/2019 | Hira et al. |
| 2019/0229987 A1 | 7/2019 | Shelke et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0245757 A1 | 8/2019 | Meyer et al. |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0084112 A1 | 3/2020 | Kandaswamy et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0280592 A1* | 9/2020 | Ithal .................. H04L 67/1023 |
| 2020/0301801 A1 | 9/2020 | Hegde |
| 2020/0314006 A1 | 10/2020 | Mackie et al. |
| 2020/0314173 A1 | 10/2020 | Pahwa et al. |
| 2020/0344120 A1 | 10/2020 | Pianigiani et al. |
| 2020/0366558 A1 | 11/2020 | Vaidya et al. |
| 2020/0374186 A1 | 11/2020 | Scott |
| 2020/0379812 A1 | 12/2020 | Ranjan et al. |
| 2020/0382556 A1 | 12/2020 | Woolward et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1 | 3/2021 | Alluboyina et al. |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0218652 A1 | 7/2021 | Raut et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1 | 10/2021 | Zhou et al. |
| 2021/0328858 A1 | 10/2021 | Asveren et al. |
| 2021/0349765 A1 | 11/2021 | Zhou et al. |
| 2021/0352044 A1 | 11/2021 | Asveren et al. |
| 2021/0365308 A1 | 11/2021 | Myneni et al. |
| 2021/0397466 A1 | 12/2021 | McKee et al. |
| 2021/0409336 A1 | 12/2021 | Talur et al. |
| 2022/0012045 A1 | 1/2022 | Rudraraju et al. |
| 2022/0035651 A1 | 2/2022 | Maurya et al. |
| 2022/0038311 A1 | 2/2022 | Shen et al. |
| 2022/0070250 A1 | 3/2022 | Baid et al. |
| 2022/0091868 A1 | 3/2022 | Malleni et al. |
| 2022/0158926 A1 | 5/2022 | Wennerström et al. |
| 2022/0182439 A1 | 6/2022 | Zhou et al. |
| 2022/0200865 A1 | 6/2022 | Vaidya et al. |
| 2022/0210113 A1 | 6/2022 | Pillareddy et al. |
| 2022/0278926 A1* | 9/2022 | Sharma ................. H04L 41/046 |
| 2022/0303246 A1 | 9/2022 | Miriyala et al. |
| 2022/0311738 A1 | 9/2022 | Singh et al. |
| 2022/0321495 A1 | 10/2022 | Liu et al. |
| 2022/0400053 A1 | 12/2022 | Liu et al. |
| 2023/0020458 A1* | 1/2023 | Chaudhary ......... G06F 11/1464 |
| 2023/0043362 A1 | 2/2023 | Kita et al. |
| 2023/0070224 A1 | 3/2023 | Huo et al. |
| 2023/0094937 A1* | 3/2023 | Arndt .................. H04L 41/0695 |
| | | 718/1 |
| 2023/0104568 A1 | 4/2023 | Miriyala et al. |
| 2023/0153162 A1* | 5/2023 | Baillargeon .......... G06F 9/5044 |
| | | 718/104 |
| 2023/0179484 A1 | 6/2023 | Liu et al. |
| 2023/0179573 A1 | 6/2023 | Sosnovich et al. |
| 2023/0231827 A1 | 7/2023 | Tang et al. |
| 2023/0244591 A1 | 8/2023 | Sun et al. |

FOREIGN PATENT DOCUMENTS

| | | |
|---|---|---|
| CN | 105897946 A | 8/2016 |
| CN | 106789367 A | 5/2017 |
| CN | 107947961 A | 4/2018 |
| CN | 108809722 A | 11/2018 |
| CN | 110531987 A | 12/2019 |
| CN | 110611588 A | 12/2019 |
| CN | 111327640 A | 6/2020 |
| CN | 111371627 A | 7/2020 |
| CN | 111865643 A | 10/2020 |
| CN | 113141386 A | 7/2021 |
| EP | 2464151 A2 | 6/2012 |
| EP | 2464152 A2 | 6/2012 |
| EP | 2830270 A1 | 1/2015 |
| EP | 3316532 A1 | 5/2018 |
| EP | 3617879 A1 | 3/2020 |
| JP | 2011070707 A | 4/2011 |
| JP | 2012099048 A | 5/2012 |
| JP | 2014535213 A | 12/2014 |

(56) References Cited

FOREIGN PATENT DOCUMENTS

| | | | |
|---|---|---|---|
| JP | 2015115043 A | 6/2015 | |
| JP | 2018523932 A | 8/2018 | |
| WO | 2011159842 A2 | 12/2011 | |
| WO | 2013063330 A1 | 5/2013 | |
| WO | 2016160523 A1 | 10/2016 | |
| WO | 2018044341 A1 | 3/2018 | |
| WO | 2018044352 A1 | 3/2018 | |
| WO | 2019241086 A1 | 12/2019 | |
| WO | 2020041073 A1 | 2/2020 | |
| WO | 2020041074 A1 | 2/2020 | |
| WO | 2021196080 A1 | 10/2021 | |
| WO | 2022026028 A1 | 2/2022 | |
| WO | 2022204941 A9 | 10/2022 | |
| WO | 2023133797 A1 | 7/2023 | |

OTHER PUBLICATIONS

Author Unknown, "Chapter 4: Default Security Policy," IBM Security Access Manager Version 9.0, Oct. 2015, 18 pages.

Author Unknown, "Containers and Container Networking for Network Engineers: VMware NSX Container Networking," Jan. 2018, 58 pages, VMware, Inc.

Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.

Abhashkumar, Anubhavnidhi, et al., "Supporting Diverse Dynamic Intent-based Policies Using Janus," CoNEXT 17, Dec. 12-15, 2017, 14 pages, ACM, Incheon, KR.

Abwnawar, Nasser, "A Policy-Based Management Approach to Security in Cloud Systems," Feb. 2020, 184 pages, De Monfort University, Leicester, UK.

Author Unknown, "E-Security Begins with Sound Security Policies," Jun. 14, 2001, 23 pages, Symantec Corporation.

Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.

Author Unknown, "OpenShift Container Platform 4.6," Mar. 3, 2021, 41 pages, Red Hat, Inc.

Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Non-published commonly owned U.S. Appl. No. 17/112,689, filed Dec. 4, 2020, 63 pages, VMware, Inc.

Non-published Commonly Owned U.S. Appl. No. 17/333,136, filed May 28, 2021, 32 pages, VMware, Inc.

Non-published Commonly Owned U.S. Appl. No. 17/389,305, filed Jul. 29, 2021, 32 pages, VMware, Inc.

Non-published Commonly Owned Related U.S. Appl. No. 17/684,169 with similar specification, filed Mar. 1, 2022, 41 pages, VMware, Inc.

Non-Published Commonly Owned U.S. Appl. No. 17/692,634, filed Mar. 11, 2022, 42 pages, VMware, Inc.

Rouse, Margaret, "What is SDDC (software-defined data center)?—Definition from WhatIs.com," Mar. 2017, 5 pages, TechTarget.com.

Sayfan, Gigi, "Mastering Kubernetes: Automating container deployment and management," May 2017, 426 pages, Packt Publishing, Birmingham, UK.

Wodicka, Brent, "A Developer's Guide to Container Orchestration, Kubernetes, & AKS," Mar. 19, 2019, 5 pages, AIS, Reston, VA, USA.

Author Unknown, "NSX vSphere API Guide—NSX 6.2 for vSphere," Jan. 6, 2017, 400 pages, VMware, Inc.

Non-Published Commonly Owned U.S. Appl. No. 18/102,700, filed Jan. 28, 2023, 39 pages, VMware, Inc.

Non-Published Commonly Owned U.S. Appl. No. 18/211,360, filed Jun. 19, 2023, 41 pages, VMware, Inc.

PCT International Search Report and Written Opinion of Commonly Owned International Patent Application PCT/CN2022/071987, mailing date Jun. 7, 2022, 13 pages, International Searching Authority (EPO).

Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.

Author Unknown, "Assign Memory Resources to Containers and Pods," Oct. 17, 2020, 7 pages.

Author Unknown, "NSX and Micro-segmentation," Jan. 3, 2017, 2 pages, retrieved from https://www.youtube.com/watch?v=I_QtISXaxkE.

Author Unknown, "NSX Policy API: Getting Started Guide," Technical White Paper, Sep. 2019, 28 pages, VMware, Inc.

Author Unknown, "VMware NSX for vSphere 6.4—Application Rule Manager Enhancements," Jan. 20, 2018, 2 pages, retrieved from https://www.youtube.com/watch?v=r3IKNkt5mi8.

Author Unknown, "VMware NSX-T 2.4: Advancing NSX Everywhere for Everyone," Feb. 27, 2019, 2 pages, retrieved from https://www.youtube.com/watch?v=IqPyRBWABHg.

Non-Published Commonly Owned U.S. Appl. No. 18/227,306, filed Jul. 28, 2023, 37 pages, VMware, Inc.

Patni, Sanjay, "Pro RESTful APIs," Month Unknown 2017, 136 pages, Apress, New York City, NY, USA.

* cited by examiner

PER-NAMESPACE IP ADDRESS MANAGEMENT METHOD FOR CONTAINER NETWORKS

BACKGROUND

Container networks (e.g., Kubernetes) are an increasingly popular type of network system for deploying applications in datacenters. The sets of containers produced by such a system can be deployed more rapidly than virtual machines (VMs) or physical computers. Therefore, a deployment can be scaled up or down to meet demand more rapidly than is typical for VMs or physical computers. In addition, a set of containers in a container network system has less overhead and can generally perform the same tasks faster than a corresponding VM would.

In some present container-based network systems (e.g., Kubernetes), sets of containers are instantiated within nodes. Each node in the present system has a single subnet. Any pod or container executed within a particular node is limited to IP addresses within that subnet. This means that when a pod or container in the present system moves to another node, it can no longer keep the same IP address. Additionally, this means that containers and sets of containers on different nodes must be on different subnets, even if they have closely related functions, are owned by the same client, are part of the same namespace (group of resources within a single cluster), etc. Accordingly, there is a need in the art for a method of assigning subnets to individual namespaces, even when sets of containers of those namespaces are implemented on different nodes.

BRIEF SUMMARY

Some embodiments of the invention provide a method for sending data in a network (e.g., an Antrea Kubernetes network) that includes multiple nodes that each execute at least one set of containers, a gateway interface, and a virtual local area network (VLAN) tunnel interface. The method configures the gateway interface of each node to associate the gateway interface with multiple subnets that are each associated with a namespace. A first node in the container network executes a first set of containers of a first namespace, and a second node in the container network executes a second set of containers of the first namespace and a third set of containers of a second namespace. The method sends data between the first set of containers and the second set of containers through a VLAN tunnel between the first and second nodes, and sends data between the first set of containers and the third set of containers through the gateway interface.

In some embodiments, each set of containers executes within a respective pod, with each pod being a group of one or more containers that share storage and network resources. To send data between a first pod that includes the first set of containers and a third pod that includes the third set of containers through the gateway interface, the data is sent from the gateway of the first node through the VLAN interface of the first node and through the VLAN interface of the second node. The VLAN interface and the gateway interface of each node, in some embodiments, are interfaces of a virtual switch of the node. In some embodiments, the virtual switch also includes one or more virtual Ethernet interfaces that are each associated with a different pod executing on the node.

In order to send data between the first pod and a second pod that includes the second set of containers through the VLAN tunnel, some embodiments perform a layer 2 (L2) lookup to identify and reach the VLAN interface. Once the data has reached the VLAN interface, in some embodiments, the data is then encapsulated at the VLAN interface and forwarded to the VLAN interface at the destination node through the VLAN tunnel. The VLAN interface at the destination node then decapsulates the data and forwards the data to the second pod. In some embodiments, the VLAN tunnel is a Geneve tunnel and the data sent through the tunnel is encapsulated with a Geneve tunnel header.

Each pod, in some embodiments, is assigned a static IP address that is then stored in a configuration file of the pod. In some embodiments, a pod may be migrated from one pod to another pod. In some such embodiments, the static IP address assigned to the pod is maintained during the migration. Each namespace, in some embodiments, is assigned a set of IP addresses, and the static IP addresses assigned to the pods are provided from the set of IP addresses assigned to the pod's respective namespace. In some embodiments, the set of IP addresses may include a different number of IP addresses. For instance, the first namespace is assigned a different number of IP addresses than the second namespace, in some embodiments.

In some embodiments, an IP address for a newly instantiated pod can be obtained by sending a remote procedure call (RPC) request to a server of the network. For instance, when a fourth pod of the first namespace is instantiated on the first node, in some embodiments, an RPC request is sent from the first node to a server of the network, and, in response to the RPC, an IP address, that is within the set of IP addresses assigned to the first namespace, is provided for the fourth pod. In some embodiments, the provided IP address is assigned to the fourth pod by an IP address management interface of the first node that is responsible for assigning IP addresses to pods executing on the first node.

Some embodiments of the invention also provide a method of sending data between sets of containers that execute on the same worker node. Like the embodiments described above, the method configures the gateway interface of the worker node to associate the gateway interface with multiple subnets that are each associated with a namespace, while the worker node executes at least first and second sets of containers of a first namespace, and a third set of containers of a second namespace. The method sends data between the first and second sets of containers, which belong to the same first namespace, through a first virtual Ethernet interface associated with the first set of containers and a second virtual Ethernet interface associated with the second set of containers. For data sent between the first set of containers and the third set of containers, the method sends the data through the first virtual Ethernet interface associated with the first set of containers, the gateway interface, and a third virtual Ethernet interface associated with the third set of containers.

In some embodiments, the worker node executes on a host computer that includes a NIC (network interface card) for exchanging data with elements external to the host computer. In some such embodiments, data sent from any of the sets of containers executing on the worker node to an element external to the host computer would be sent through the virtual Ethernet interface associated with the source set of containers, through the gateway interface, and through the NIC of the host computers. The worker node, in some embodiments, is one of multiple worker nodes executing on the host computer, along with a software switch that includes ports for forwarding data between interfaces of the worker nodes, as well as between these worker node interfaces and the NIC of the host computer (i.e., for sending data to a destination external to the host computer).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
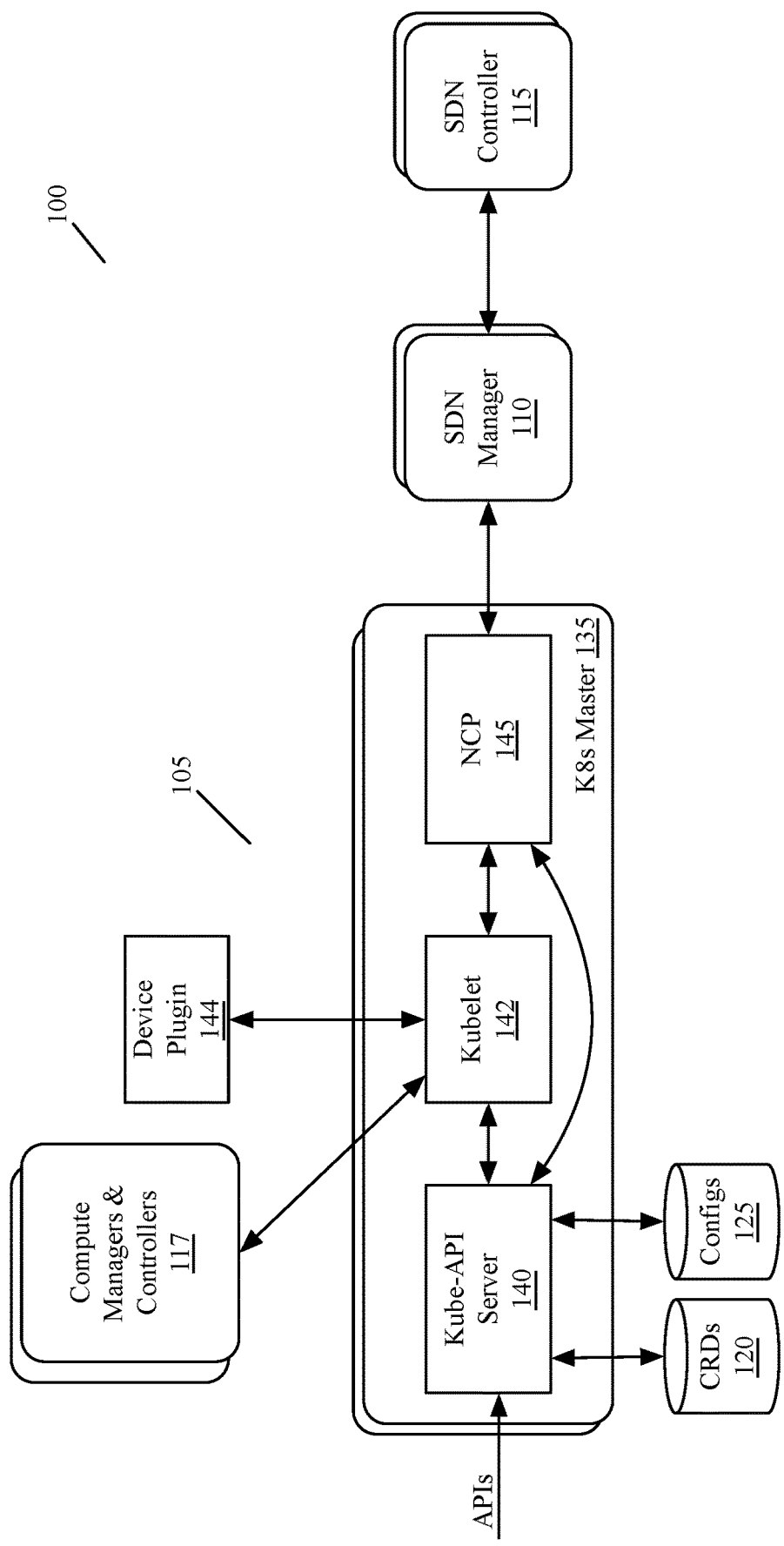
FIG. 1 illustrates an example of a control system of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for sending data in a network (e.g., an Antrea Kubernetes network) that includes multiple nodes that each execute at least one set of containers, a gateway interface, and a virtual local area network (VLAN) tunnel interface. The method configures the gateway interface of each node to associate the gateway interface with multiple subnets that are each associated with a namespace. A first node in the container network executes a first set of containers of a first namespace, and a second node in the container network executes a second set of containers of the first namespace and a third set of containers of a second namespace. The method sends data between the first set of containers and the second set of containers through a VLAN tunnel between the first and second nodes, and sends data between the first set of containers and the third set of containers through the gateway interface.

Many of the embodiments described herein are described with relation to a Kubernetes system, sometimes abbreviated "Kubes" or "K8s". However, one of ordinary skill in the art will understand that this is merely one example of a network system that embodies the inventions described herein and that other embodiments of the invention may apply to other network systems and container network systems.

In the Kubernetes system, a container is an immutable (i.e., cannot be changed once it starts running), lightweight executable image that contains software (also referred to as the container runtime) and all of its dependencies (e.g., libraries, etc.) required for running an application. The containers decouple the applications from the underlying host infrastructure, thereby simplifying deployment. Examples of container runtimes that are supported by Kubernetes include Docker, containerd, CRI-O, and the Kubernetes Container Runtime Interface (CRI).

In some embodiments, a container is executed as a set of one or more containers. In some such embodiments, each set of containers may execute within a respective pod. In a Kubernetes system, a pod is the smallest deployable unit that can be created (e.g., by a user), and acts as a logical host by containing the set of one or more tightly-coupled containers. Each pod includes storage and network resources (e.g., ports for communications external to the pod) to be shared by the containers executing in the pod, as well as a specification for how to run those containers. In some embodiments, the contents of a pod are always stored together and executed together.

In addition to the templates and code that is supplied by the original programmers of the Kubernetes system, the system allows a user to create customized resources. The network control system of some embodiments processes one or more Custom Resource Definitions (CRDs) that define attributes of custom-specified network resources. The CRDs define extensions to the Kubernetes networking requirements. Some embodiments use the following CRDs: network-attachment-definition (NDs), Virtual Network Interfaces (VIF) CRDs, Virtual Network CRDs, Endpoint Group CRDs, security CRDs, Virtual Service Object (VSO) CRDs, and Load Balancer CRD.

In some embodiments, each set of containers executes within a respective pod, with each pod being a group of one or more containers that share storage and network resources. To send data between a first pod that includes the first set of containers and a third pod that includes the third set of containers through the gateway interface, the data is sent from the gateway of the first node through the VLAN interface of the first node and through the VLAN interface of the second node. The VLAN interface and the gateway interface of each node, in some embodiments, are interfaces of a virtual switch of the node. In some embodiments, the virtual switch also includes one or more virtual Ethernet interfaces that are each associated with a different pod executing on the node.

In order to send data between the first pod and a second pod that includes the second set of containers through the VLAN tunnel, some embodiments perform a layer 2 (L2) lookup to identify and reach the VLAN interface. Once the data has reached the VLAN interface, in some embodiments, the data is then encapsulated at the VLAN interface and forwarded to the VLAN interface at the destination node through the VLAN tunnel. The VLAN interface at the destination node then decapsulates the data and forwards the data to the second pod. In some embodiments, the VLAN tunnel is a Geneve tunnel and the data sent through the tunnel is encapsulated with a Geneve tunnel header.

Each pod, in some embodiments, is assigned a static IP address that is then stored in a configuration file of the pod. In some embodiments, a pod may be migrated from one pod to another pod. In some such embodiments, the static IP address assigned to the pod is maintained during the migration. Each namespace, in some embodiments, is assigned a set of IP addresses, and the static IP addresses assigned to the pods are provided from the set of IP addresses assigned to the pod's respective namespace. In some embodiments, the set of IP addresses may include a different number of IP addresses. For instance, the first namespace is assigned a different number of IP addresses than the second namespace, in some embodiments.

In some embodiments, an IP address for a newly instantiated pod can be obtained by sending a remote procedure call (RPC) request to a server of the network. For instance, when a fourth pod of the first namespace is instantiated on the first node, in some embodiments, an RPC request is sent from the first node to a server of the network, and, in response to the RPC, an IP address, that is within the set of IP addresses assigned to the first namespace, is provided for the fourth pod. In some embodiments, the provided IP address is assigned to the fourth pod by an IP address management interface of the first node that is responsible for assigning IP addresses to pods executing on the first node.

Some embodiments of the invention also provide a method of sending data between sets of containers that execute on the same worker node. Like the embodiments described above, the method configures the gateway interface of the worker node to associate the gateway interface with multiple subnets that are each associated with a namespace, while the worker node executes at least first and second sets of containers of a first namespace, and a third set of containers of a second namespace. The method sends data between the first and second sets of containers, which belong to the same first namespace, through a first virtual Ethernet interface associated with the first set of containers and a second virtual Ethernet interface associated with the second set of containers. For data sent between the first set of containers and the third set of containers, the method sends the data through the first virtual Ethernet interface associated with the first set of containers, the gateway interface, and a third virtual Ethernet interface associated with the third set of containers.

In some embodiments, the worker node executes on a host computer that includes a NIC (network interface card) for exchanging data with elements (e.g., other host computers, compute nodes, forwarding elements, etc.) external to the host computer. In some such embodiments, data sent from any of the sets of containers executing on the worker node to an element external to the host computer would be sent through the virtual Ethernet interface associated with the source set of containers, through the gateway interface, and through the NIC of the host computers. The worker node, in some embodiments, is one of multiple worker nodes executing on the host computer, along with a software switch that includes ports for forwarding data between interfaces of the worker nodes, as well as between these worker node interfaces and the NIC of the host computer (i.e., for sending data to a destination external to the host computer, such as a node executing on a different host computer).

FIG. 1 illustrates an example of a control system 100 of some embodiments of the invention. This system 100 processes APIs that use the Kubernetes-based declarative model to describe the desired state of (1) the machines to deploy, and (2) the connectivity, security and service operations that are to be performed for the deployed machines (e.g., private and public IP addresses connectivity, load balancing, security policies, etc.). To process these APIs, the control system 100 uses one or more CRDs to define some of the resources referenced in the APIs. The system 100 performs automated processes to deploy a logical network that connects the deployed machines and segregates these machines from other machines in the datacenter set. The machines are connected to the deployed logical network of a virtual private cloud (VPC) in some embodiments.

As shown, the control system 100 includes an API processing cluster 105, a software defined network (SDN) manager cluster 110, an SDN controller cluster 115, and compute managers and controllers 117. The API processing cluster 105 includes two or more API processing nodes 135, with each node comprising an API processing server 140, a kubelet 142 node agent, and a network controller plugin (NCP) 145. The API processing server 140 receives intent-based API calls and parses these calls. In some embodiments, the received API calls are in a declarative, hierarchical Kubernetes format, and may contain multiple different requests.

The API processing server 140 parses each received intent-based API request into one or more individual requests. When the requests relate to the deployment of machines, the API server provides these requests directly to compute managers and controllers 117, or indirectly provide these requests to the compute managers and controllers 117 through the kubelet 142 and/or the NCP 145 running on the Kubernetes master node 135. The compute managers and controllers 117 then deploy VMs and/or sets of containers on host computers in the availability zone.

The kubelet 142 node agent on a node can register the node with the API server 140 using one of: the hostname; a flag to override the hostname; or specific logic for a cloud provider. The kubelet 142 receives sets of containerspecs, YAML (a data serialization language) or JavaScript Object Notation (JSON) formatted objects that each describe a pod. The kubelet 142 uses sets of containerspecs to create (e.g., using the compute managers and controllers 117) the sets of containers that are provided by various mechanism elements (e.g., from the API server 140) and ensures that the containers described in those sets of containerspecs are running and healthy.

The API calls can also include requests that require network elements to be deployed. In some embodiments, these requests explicitly identify the network elements to deploy, while in other embodiments the requests can also implicitly identify these network elements by requesting the deployment of compute constructs (e.g., compute clusters, containers, etc.) for which network elements have to be defined by default. As further described below, the control system 100 uses the NCP 145 to identify the network elements that need to be deployed, and to direct the deployment of these network elements.

In some embodiments, the API calls refer to extended resources that are not defined per se by the baseline Kubernetes system. For these references, the API processing server 140 uses one or more CRDs 120 to interpret the references in the API calls to the extended resources. As mentioned above, the CRDs in some embodiments include the NDs, VIF, Virtual Network, Endpoint Group, Security Policy, Admin Policy, and Load Balancer and VSO CRDs. In some embodiments, the CRDs are provided to the API processing server 140 in one stream with the API calls.

NCP 145 is the interface between the API server 140 and the SDN manager cluster 110 that manages the network elements that serve as the forwarding elements (e.g., switches, routers, bridges, etc.) and service elements (e.g., firewalls, load balancers, etc.) in an availability zone. The SDN manager cluster 110 directs the SDN controller cluster 115 to configure the network elements to implement the desired forwarding elements and/or service elements (e.g., logical forwarding elements and logical service elements) of one or more logical networks. As further described below, the SDN controller cluster 115 interacts with local controllers on host computers and edge gateways to configure the network elements in some embodiments.

In some embodiments, NCP 145 registers for event notifications with the API server 140, e.g., sets up a long-pull session with the API server to receive all CRUD (Create, Read, Update and Delete) events for various CRDs that are defined for networking. In some embodiments, the API server 140 is a Kubernetes master VM, and the NCP 145 runs in this VM as a Pod. NCP 145 in some embodiments collects realization data from the SDN resources for the CRDs and provide this realization data as it relates to the CRD status. In some embodiments, the NCP 145 communicates directly with the API server 140 and/or through the kubelet 142.

In some embodiments, NCP 145 processes the parsed API requests relating to NDs, VIFs, virtual networks, load balancers, endpoint groups, security policies, and VSOs, to direct the SDN manager cluster 110 to implement (1) the NDs that designate network segments for use with secondary interfaces of sets of containers, (2) the VIFs needed to connect VMs and sets of containers to forwarding elements on host computers, (3) virtual networks to implement different segments of a logical network of the VPC, (4) load balancers to distribute the traffic load to endpoint machines, (5) firewalls to implement security and admin policies, and (6) exposed ports to access services provided by a set of machines in the VPC to machines outside and inside of the VPC.

The API server 140 provides the CRDs 120 that have been defined for these extended network constructs to the NCP 145 for it to process the APIs that refer to the corresponding network constructs (e.g., network segments). The API server 140 also provides configuration data from the configuration storage 125 to the NCP 145. The configuration data in some embodiments include parameters that adjust the pre-defined template rules that the NCP 145 follows to perform its automated processes. In some embodiments, the configuration data includes a configuration map. The configuration map of some embodiments may be generated from one or more directories, files, or literal values. The configuration map (or "ConfigMap") is discussed further with respect to the device plugin 144, below.

The NCP 145 performs these automated processes to execute the received API requests in order to direct the SDN manager cluster 110 to deploy the network elements for the VPC. For a received API, the control system 100 performs one or more automated processes to identify and deploy one or more network elements that are used to implement the logical network for a VPC. The control system performs these automated processes without an administrator performing any action to direct the identification and deployment of the network elements after an API request is received.

The SDN managers 110 and controllers 115 can be any SDN managers and controllers available today. In some embodiments, these managers and controllers are the NSX-T managers and controllers licensed by VMware Inc. In such embodiments, NCP 145 detects network events by processing the data supplied by its corresponding API server 140, and uses NSX-T APIs to direct the NSX-T manager 110 to deploy and/or modify NSX-T network constructs needed to implement the network state expressed by the API calls. The communication between the NCP and NSX-T manager 110 is asynchronous communication, in which NCP provides the desired state to NSX-T managers, which then relay the desired state to the NSX-T controllers to compute and disseminate the state asynchronously to the host computer, forwarding elements and service nodes in the availability zone (i.e., to the SDDC set controlled by the controllers 115).

After receiving the APIs from the NCPs 145, the SDN managers 110 in some embodiments direct the SDN controllers 115 to configure the network elements to implement the network state expressed by the API calls. In some embodiments, the SDN controllers serve as the central control plane (CCP) of the control system 100.

In some embodiments, a device plug-in 144 identifies resources available to the sets of containers on a node based on a configuration map of the node. The configuration map in some embodiments is received from the API server 140. In some embodiments, the configuration map is generated from files in the configuration storage 125, from data received by the API server from the NCP and/or from data generated by the SDN manager 110. In some embodiments, the device plug-in receives the configuration map directly from the API server 140. In other embodiments, the device plug-in receives the configuration map through the kubelet 142. The configuration map in some embodiments includes identifiers of pre-created network segments of the logical network.

A network segment, sometimes called a logical switch, logical network segment, or a transport zone, acts in a manner similar to a subnet, e.g., a layer 2 broadcast zone. Individual sets of containers can interface with a network segment and communicate with other sets of containers or devices configured to interface with the network segment. However, one of ordinary skill in the art will understand that a network segment (or logical switch) does not operate as a physical switch connecting devices that are both directly connected to the same switch, but for example as a VPN tunnel or VLAN, allowing sets of containers or devices that are not directly connected to communicate as though they are all connected to a common switch.

Figure 2:
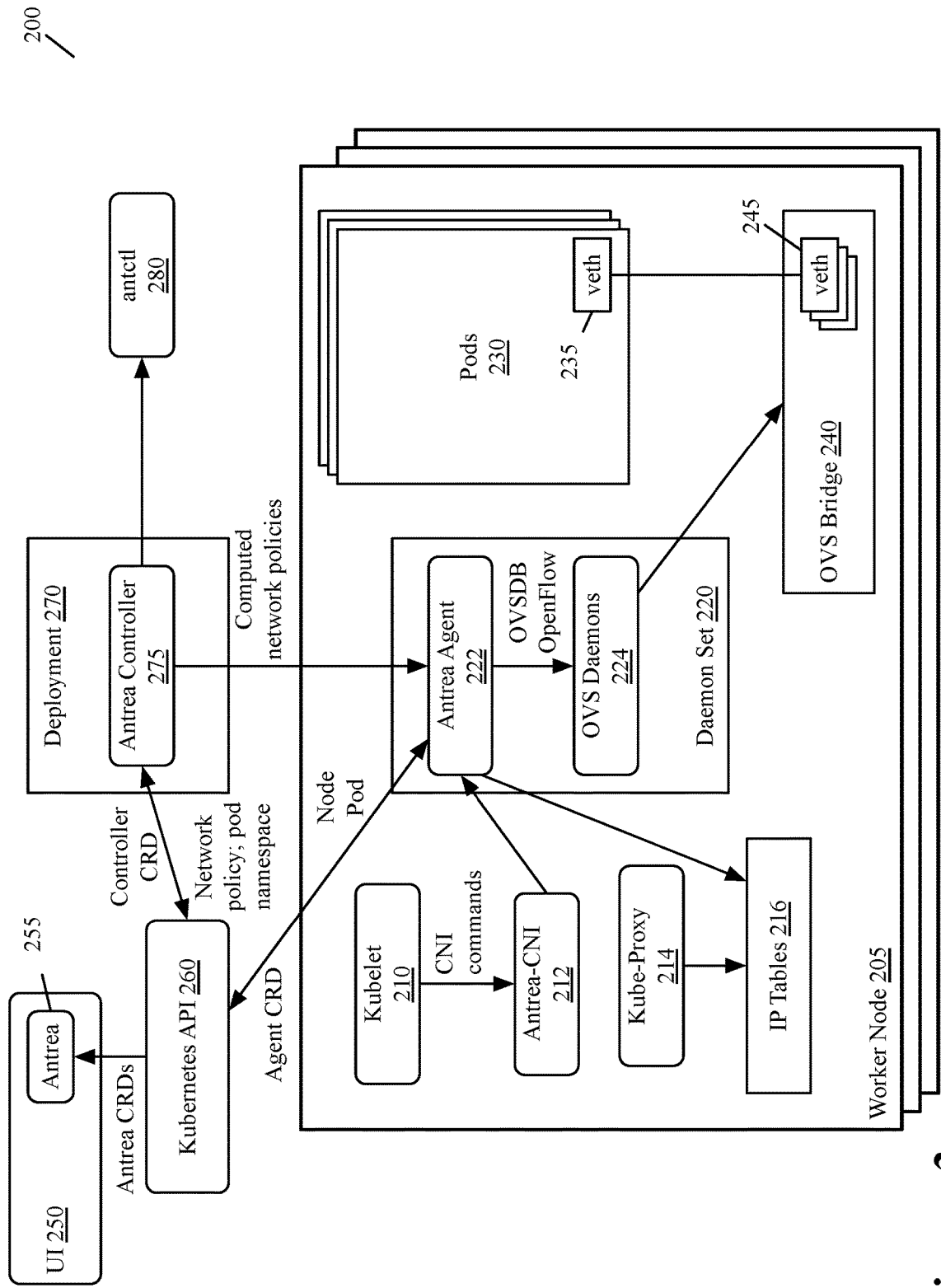
FIG. 2 illustrates an Antrea networking solution of some embodiments.

FIG. 2 illustrates an Antrea networking solution of some embodiments. As a Kubernetes networking solution, Antrea implements the Container Network Interface (CNI), while Kubernetes NetworkPolicy operates at Layer 3/4 (L3/L4) to provide network connectivity and security services for a Kubernetes cluster (i.e., collection of nodes for running containerized applications), leveraging the benefit of programmable networks from Open vSwitch (OVS) to Kubernetes. OVS is a widely adopted high-performance programmable virtual switch, originating from VMware, Inc., that is designed to enable effective network automation through programmable extensions. The Antrea network solution described herein leverages OVS in its architecture to efficiently implement pod networking and security features.

In some embodiments, because of the programmable OVS, forwarding functions are opened to programmatic extension and control. Based on this, a new flexible Antrea IPAM plugin overrides and extends the existing flow tables, which are managed by a new centralized custom resource definition (CRD) instead of a local store IP management state from the original host-local IPAM plugin. This centralized controller helps to provide the ability of multiple networks on pod and IPAM per-namespace, according to some embodiments. In some embodiments, in an L3 forwarding table, all traffic destined to a remote pod is forwarded through the appropriate tunnel, and for the return flow from a remote pod to local node, a distinction must be drawn between the remote gateway and the local gateway, according to some embodiments.

As shown, the Antrea networking solution 200 includes Kubernetes nodes 205, a user interface (UI) 250 with an Antrea plugin 255, a Kubernetes API server 260, a deployment 270 that runs the Antrea controller 275, and Antrea command-line tool 280 (i.e., antctl 280). In some embodiments, the UI 250, Kubernetes API server 260, deployment 270, and Antrea command-line tool 280 execute together as part of the control plane on a single master node.

To provide a more flexible IPAM (host-local IP address management) that is based on namespace isolation, the deployment 270 runs the Antrea controller 275, which is used along with corresponding CRDs (custom resource definitions) to manage all of the IP addresses for pods executing on nodes in the network. As a result, each pod subnet is associated with a respective namespace such that the IP assigned to a pod is related to its business, in some embodiments. Additionally, pods located under the same namespace are in the same local area network (LAN), in some embodiments, while pods under different namespaces are isolated on different networks. In some embodiments, a static IP address assigned to a pod can be configured by the annotation filed for the corresponding configuration file. Users (e.g., administrators) could also monitor the IP usage from the Antrea command-line tool 280 or the UI 250 in order to expand the corresponding IP resource pool in a timely manner when IP resources are exhausted, according to some embodiments.

The UI 250 is used to manage Kubernetes clusters by translating human-readable commands into API calls that can be understood by the Kubernetes API server 260. In some embodiments, the UI 250 is a VMware Octant UI, and presents its output in a graphical user interface (GUI) for viewing by a user (e.g., administrator). The UI 250 runs locally on the user's workstation, according to some embodiments, and as a result, does not use up resources of the node or nodes that it manages. The UI 250 includes Antrea plugin 255 for receiving Antrea CRDs from the Kubernetes API server 260.

The Antrea controller 275 additionally monitors network policy, pod, and namespace resources with the Kubernetes API 260. The Antrea controller 275, in some embodiments, uses information associated with these resources to compute policy rules, which can be translated to Open vSwitch (OVS) flows efficiently and disseminated to a targeted Antrea agent (e.g., Antrea agent 222) that runs on a node along with one or more affected pods. The Kubernetes API server 260 enables different components of the Kubernetes cluster (i.e., a master node and set of one or more worker nodes) to communicate with each other and with components external to the cluster, according to some embodiments. Additionally, in some embodiments, the API server 260 enables users to query and alter the states of API objects, such as pods, namespaces, configuration maps, and events.

Each of the worker nodes 205 includes a kubelet 210, Antrea-CNI (container network interface) 212, kube-proxy 214, IP tables 216, daemonset 220, one or more pods 230, and an OVS bridge 240. The kubelet 210, in some embodiments, is responsible for registering the node 205 with the API server 260. Additionally, the kubelet 210 ensures that containers defined in pod specifications received from the API server 260 are both running and healthy. In some embodiments, instead of receiving the pod specifications from the API server 260, the kubelet 210 receives the pod specifications from an HTTP endpoint (not shown) or an HTTP server (not shown).

The daemonset 220 includes two containers to run the Antrea agent 222 and the OVS daemons 224, respectively, on every node, as well as an init-container (not shown) that installs the Antrea-CNI 212 on the node. The Antrea-CNI 212, in some embodiments, requests IP addresses for pods instantiated on the node 205, and interacts with the Antrea agent 222 to update the IP tables 216 with the assigned IP addresses. The kube-proxy 214 runs on the node 205 to maintain network rules on the node to allow network communications to the pods 230 from sessions within the cluster, as well as sessions outside of the cluster. In some embodiments, the kube-proxy 214 forwards data traffic for the pods itself using the IP addresses in the IP tables 216. In some embodiments, OVS realizes the dataplane on each of the worker nodes 205 at the same time, and in response, the Antrea controller 275 implements the control plane of the software-defined network (SDN) for which the Antrea networking solution 200 is implemented.

The Antrea agent 222 helps to bridge the Antrea controller 275 and OVS between the master node (not shown) and each other node 205 by creating the OVS bridge 240 and a veth pair for each pod 230, with one end 235 of the veth pair being in the pod's network namespace, and the other end 245 connected to the OVS bridge 240. As shown, the Antrea agent 222 interacts with the OVS bridge 240 via the OVS daemons 224. In some embodiments, on the OVS bridge 240, the Antrea agent 222 also creates an internal port antrea-gw0 (not shown) by default as the gateway of the node's subnet, and a tunnel port antrea-tun0 (not shown) for creating overlay tunnels to other nodes 205.

Figure 3:
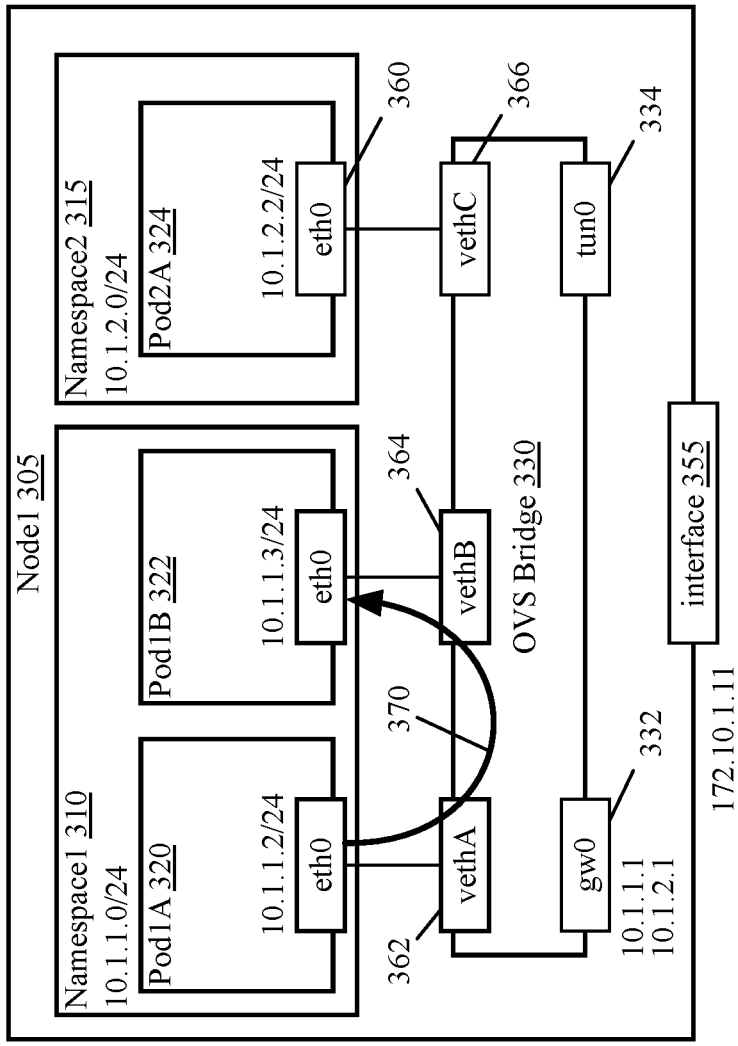
FIG. 3 illustrates an intra-node data transfer system of some embodiments for communications between pods belonging to the same namespace.

FIG. 3 illustrates an intra-node data transfer system of some embodiments for communications between pods belonging to the same namespace. As shown, the node 305 includes a first namespace 310 associated with a first subnet 10.1.1.0/24 that includes pods 320 and 322, a second namespace 315 associated with a second subnet 10.1.2.0/24 that includes the pod 324, and an OVS bridge 330. Each of the pods 320-324 includes an Ethernet interface 360 for connecting to a respective virtual ethernet interface of the OVS bridge 330. As illustrated, the Ethernet interface 360 of the pod 320 connects to the virtual Ethernet interface 362 of the OVS bridge 330, the Ethernet interface 360 of the pod 322 connects to the virtual Ethernet interface 364 of the OVS bridge 330, and the Ethernet interface 360 of the pod 324 connects to the virtual Ethernet interface 366 of the OVS bridge 330.

In addition to the virtual Ethernet interfaces 362-366, the OVS bridge 330 also includes the gateway interface 332 and tunnel interface 334. The number of IP addresses of each gateway interface 332 on the OVS bridge 330 is the same as the number of subnets such that the gateway interface 332 does not act as a single node gateway, but rather as a traffic interface that can serve multiple subnets. Accordingly, the gateway interface 332 has two IP addresses, 10.1.1.1/24 and 10.1.2.1/24, and is the common outlet for traffic between the two subnets 10.1.1.0/24 and 10.1.2.0/24. Each subnet has its own IP and routing tables (not shown) which are responsible for the traffic outside the cluster, according to some embodiments.

In this example, the pod 320 is illustrated as communicating with the pod 322 by the line 370. Because the pods 320 and 322 belong to the same namespace 310, the communications 370 only traverse the Ethernet interfaces 360 of the pods 320 and 322, and the virtual Ethernet interfaces 362 and 364, respectively, of the OVS bridge 330.

The node 305 additionally includes an interface 355 with a corresponding IP address 172.10.1.11. The interface 355, in some embodiments, connects the node 305 to other network elements external to the node 305 via intervening network fabric. In some embodiments, the node 305 executes with one or more other nodes on a host computer, and the intervening network fabric is a software switch on the host computer for connecting the nodes to each other and to network elements external to the host computer. Also, in some embodiments, the intervening network fabric includes wired or wireless connections, various network forwarding elements (e.g., switches, routers, etc.), etc., such as when pods running on nodes that execute on different host computers exchange communications. Examples of inter-node communications and communications with external elements will be described in more detail below.

Figure 4:
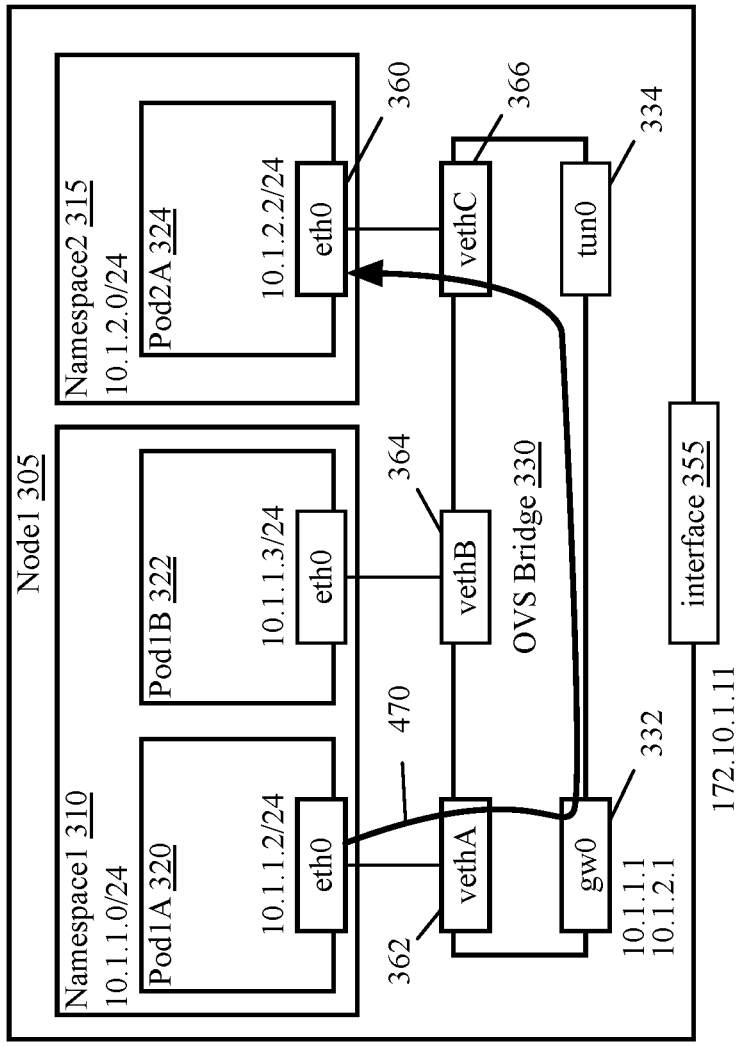
FIG. 4 illustrates an intra-node data transfer system of some embodiments for communications between pods belonging to different namespaces.

FIG. 4 illustrates an intra-node data transfer system of some embodiments for communications between pods belonging to different namespaces. While the pods 320 and 322 are able to communicate through their respective Ethernet interfaces 360 and the respective virtual Ethernet interfaces of the OVS bridge 330 based on belonging to the same namespace 310, the pods 320 and 324 belong to different namespaces 310 and 315, respectively. As such, communications 470 from the pod 320 to the pod 324 are sent from the Ethernet interface 360 of the pod 320 to the virtual Ethernet interface 362 of the OVS bridge, and are then routed by the gateway interface 332 of the OVS bridge to the virtual Ethernet interface 366 of the OVS bridge, which connects to the Ethernet interface 360 of the pod 324.

Figure 5:
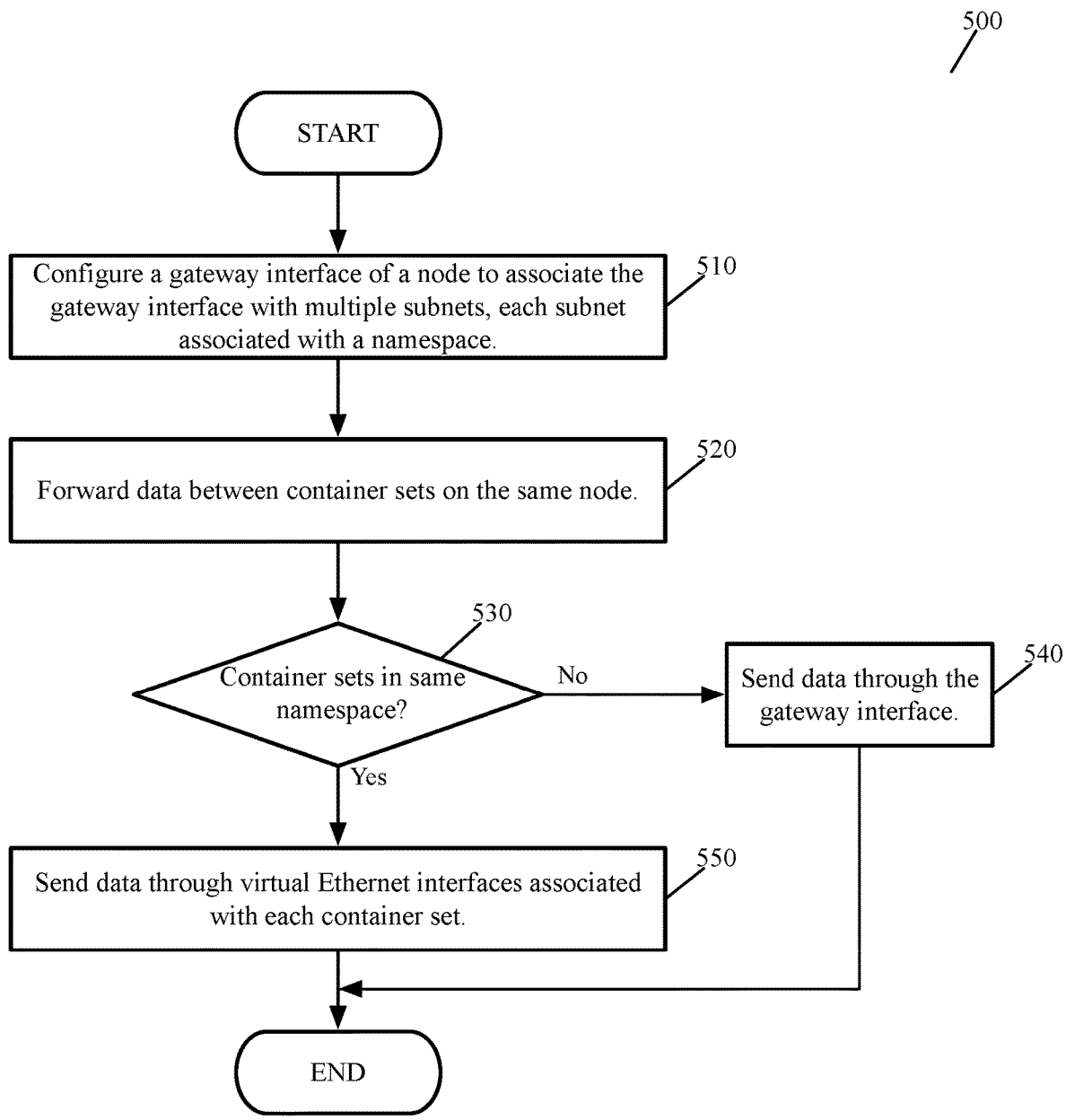
FIG. 5 conceptually illustrates a process of some embodiments for forwarding data between sets of containers on the same worker node.

FIG. 5 conceptually illustrates a process of some embodiments for forwarding data between sets of containers on the same worker node. The process 500 will be described below with reference to FIGS. 3-4. The process 500 starts by configuring (at 510) a gateway interface of a node to associate the gateway interface with multiple subnets, each subnet associated with a namespace. For instance, the gateway interface 332 has IP addresses 10.1.1.1/24 and 10.1.2.1/24, which are associated with two different subnets as described above.

The process forwards (at 520) data between container sets on the same node. For instance, data can be forwarded between any of the pods 320-324 belonging to the namespaces 310 and 315 on the node 305. As described above, data between pods belonging to the same namespace is forwarded differently than pods belonging to different namespaces because the different namespaces are isolated on different networks. In some embodiments, namespaces with the same subnet connect to a separate virtual switch in a LAN, while different subnets are routed by a virtual router.

The process determines (at 530) whether the container sets belong to the same namespace. The pods 320 and 322 belong to the first namespace 310 on the node 305, for example, while the pod 324 belongs to the second namespace 315 on the node 305. Data sent between pods belonging to the same namespace is forwarded at layer 2 (L2) by the OVS bridge, in some embodiments, whereas data sent between pods belonging to different namespaces is routed by the gateway interface of the OVS bridge.

When the process determines (at 530) that the container sets do not belong to the same namespace, the process transitions to send (at 540) the data through the gateway interface. Data between pod 320 of the namespace 310 and pod 324 of the namespace 315, for instance, follows the path 470, which is shown as traversing the gateway interface 332. Following 540, the process 500 ends.

When the process instead determines (at 530) that the container sets do belong to the same namespace, the process sends (at 550) the data through virtual Ethernet interfaces associated with each container set. For example, data between pod 320 and pod 322, which both belong to the same namespace 310, follows the path 370, which is shown as going directly from the virtual Ethernet interface 362, which is associated with the pod 320, to the virtual Ethernet interface 364, which is associated with the pod 322. Following 550, the process 500 ends.

Figure 6:
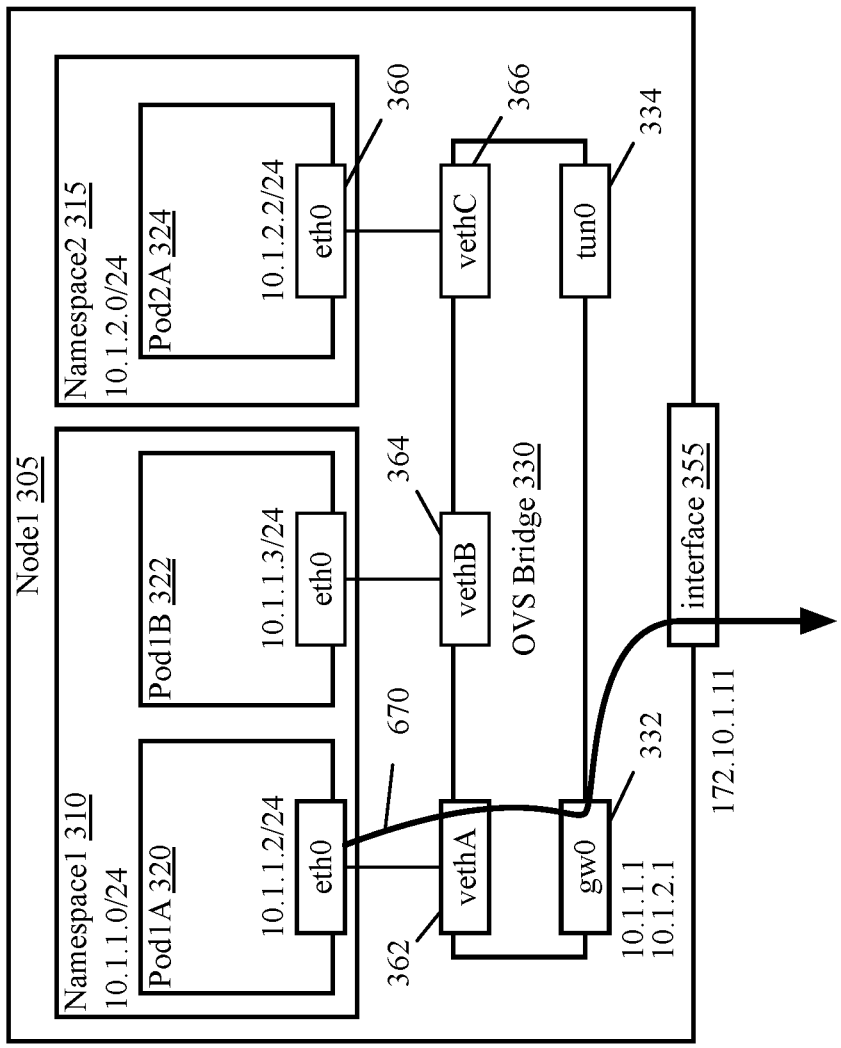
FIG. 6 illustrates a data transfer system of some embodiments between a node and an external network.

FIG. 6 illustrates a data transfer system of some embodiments between a node and an external network. In the examples described above, data traffic is described as being sent between pods executing on the same node. Like data traffic sent between pods belonging to different namespaces, data traffic sent from a pod to an external IP address is forwarded to the gateway interface 332, and routed to the appropriate network interface of the node, and sent out to the network from there, according to some embodiments.

For example, the path 670 conceptually illustrates data traffic being sent from the pod 320 belonging to the namespace 310 to a destination external to the node 305. After leaving the Ethernet interface 360 of the pod 320, the path 670 traverses the virtual Ethernet interface 362 associated with the pod 320, and is then forwarded by the gateway interface 332 through the node's interface 355. In some embodiments, the node 305 executes on a host computer (not shown), and the node's interface 355 connects the node to a network interface card (NIC) of the host computer through a software switch of the host computer. In some such embodiments, the data traffic is then forwarded by the NIC onto a network for delivery to its destination. In some embodiments, an Antrea agent (e.g., Antrea agent 222 in the solution 200 described above) on the node 305 creates an IP table rule to perform SNAT (source network address translation) on packets sent from any of the pods 320-324.

Figure 7:
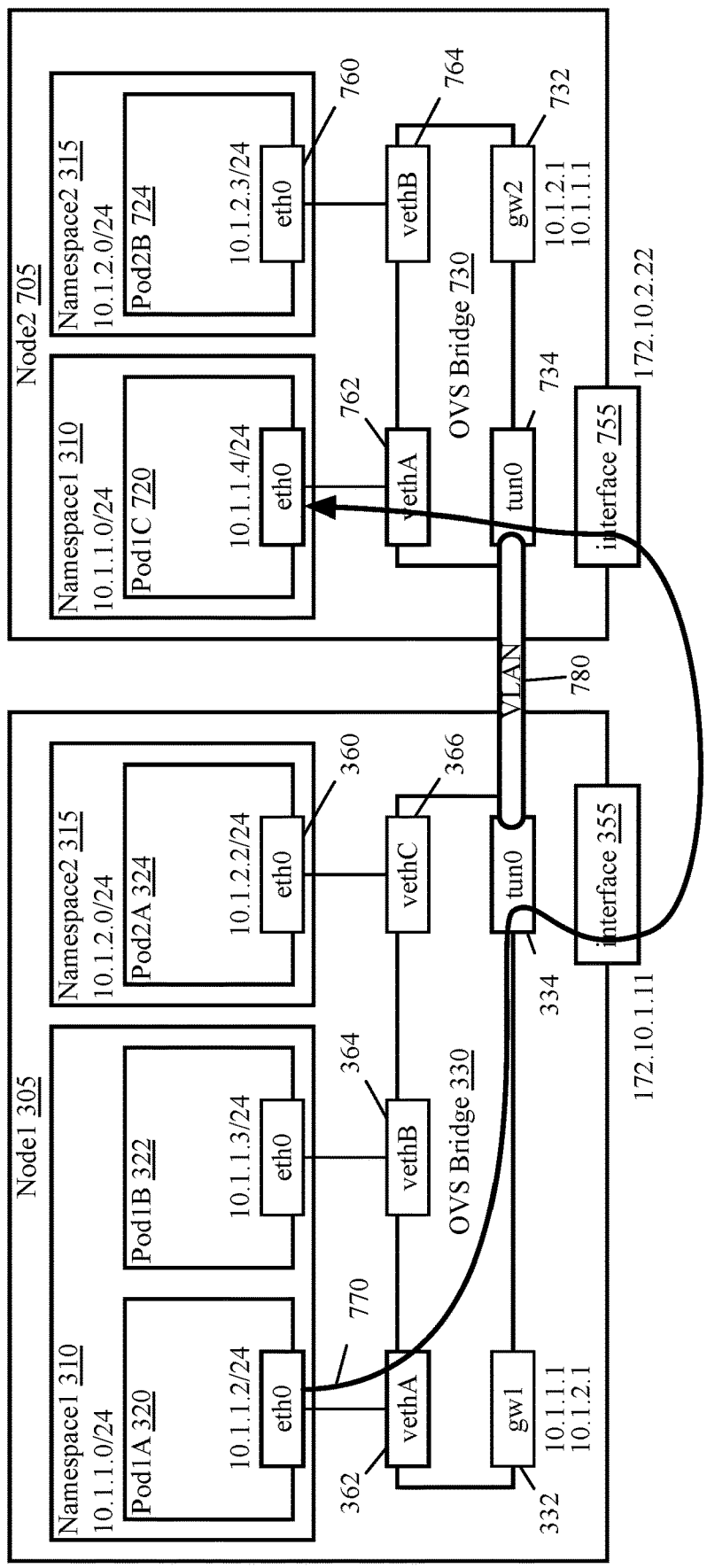
FIG. 7 illustrates an inter-node data transfer system of some embodiments for sending data between container sets executing on different nodes and belonging to the same subnet.

FIG. 7 illustrates an inter-node data transfer system of some embodiments for sending data between container sets executing on different nodes and belonging to the same subnet. In addition to the node 305, a second node 705 is instantiated, and, like the node 305, the node 705 includes the namespace 310 and the namespace 315, corresponding to the subnets 10.1.1.0/24 and 10.1.2.0/24, respectively. Additionally, the node 705 includes an OVS bridge 730, and an interface 755.

The first namespace 310 on the node 705 includes a pod 720, and the second namespace 315 on the node 705 includes a pod 724. Accordingly, the namespace 310 includes each of the pods 320, 322, and 720, while the namespace 315 includes each of the pods 324 and 724. Like the pods 320-324, each of the pods 720 and 724 includes an Ethernet interface 760, and has a corresponding virtual Ethernet interface 762 and 764 on the OVS bridge 730.

The OVS bridge 730 further includes a tunnel interface 734 and a gateway interface 732. The gateway interface 732 is associated with the two subnets 10.1.1.0/24 and 10.1.2.0/24 that are associated with the namespaces 310 and 315. Like the gateway interface 332, the gateway interface 732 has two IP addresses, 10.1.1.1/24 and 10.1.2.1/24. While the examples described herein show the gateway interfaces as being associated with two subnets, other embodiments can include additional subnets not shown.

The tunnel interfaces 334 and 734 of the OVS bridges 330 and 730 are used to create an overlay tunnel 780 between the nodes 305 and 705. The tunnel 780 is used to send data traffic between pods that execute on different nodes and belong to the same subnet, in some embodiments. In some such embodiments, the data is encapsulated at the source tunnel interface, decapsulated at the destination tunnel interface, and injected through the destination tunnel port to the OVS bridge where it is finally forwarded to its destination. The tunnel 780, in some embodiments, is a VXLAN (virtual extensible LAN) tunnel, while in other embodiments, the tunnel 780 is a Geneve tunnel, or any other OVS supported tunneling protocol.

In some embodiments, the OVS bridge stores several forwarding records, each of which includes a set of match attributes and an action attribute. The OVS bridge compares each flow with its forwarding records in order to identify a highest priority record that has a match-attribute set that matches a set of attributes of the data message flow (e.g., flow header values). When the OVS bridge matches a flow to one of its forwarding records, it then performs a forwarding operation based on the action attribute of its matching record. For the L2 lookup, the match attributes are typically L2 header values, whereas for an L3 lookup, the match attributes are typically L3 and L4 header values.

For two pods that execute on different nodes, but belong to the same subnet and namespace, data traffic is forwarded using the tunnel interfaces 334 and 734 as mentioned above. For instance, the path 770 illustrates the path traversed by data traffic sent from the pod 320 on the node 305 to the pod 720 on the node 705. The pods 320 and 720 both belong to the same subnet and namespace 310. As such, the data traffic is sent from the Ethernet interface 360 of the pod 320 to the virtual Ethernet interface 362. The virtual Ethernet interface 362 then forwards the packet to the tunnel interface 334 for encapsulation.

After the data has been encapsulated, the tunnel interface 334 forwards the data to the tunnel interface 734 on the destination node 705 such that the data traffic flows through the interface 355 of the node 305 and traverses intervening network fabric until it reaches interface 755 of the destination node 705. The data is then sent to the tunnel interface 734 for decapsulation and forwarding to the virtual Ethernet interface 762 corresponding to the destination pod 720. In some embodiments, the nodes 305 and 705 execute on different host computers. In some such embodiments, the intervening network fabric includes wired or wireless connections and various network forwarding elements (e.g., switches, routers, etc.). Alternatively, in some embodiments, the nodes 305 and 705 execute on the same host computer and the intervening network fabric includes a software switch executing on the host computer, and the software switch includes ports for connecting the nodes to each other and to a NIC of the host computer for exchanging communications with elements external to the host computer.

Figure 8:
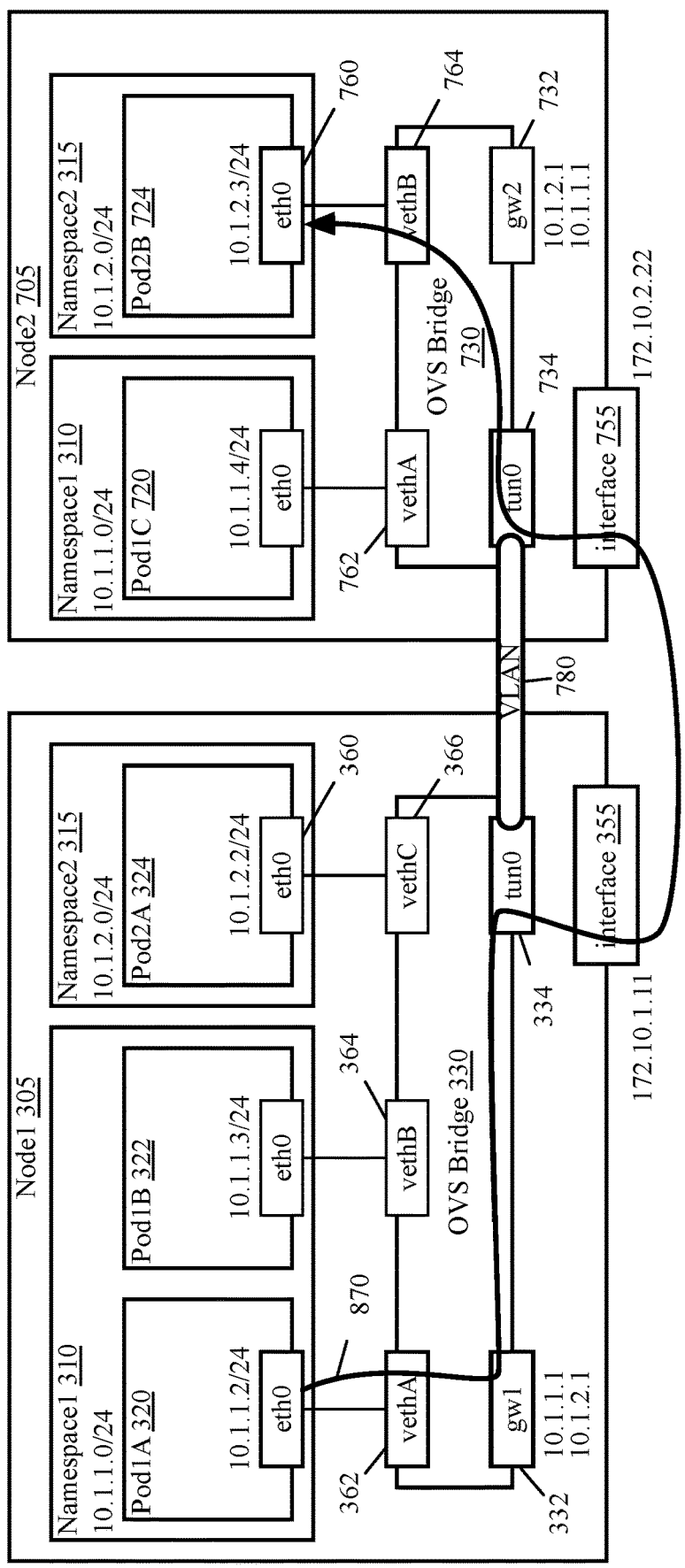
FIG. 8 illustrates an inter-node data transfer system of some embodiments for sending data between container sets executing on different nodes and belonging to different subnets.

FIG. 8 illustrates an inter-node data transfer system of some embodiments for sending data between container sets executing on different nodes and belonging to different subnets. FIG. 8 illustrates the same nodes 305 and 705, that each execute pods belonging to two namespaces 310 and 315, as illustrated by FIG. 7 described above. However, in this example, data traffic is being sent along the path 870 between pod 320 on node 305 to pod 724 on node 705. Because the pods 320 and 724 belong to different subnets, data traffic between these pods cannot traverse the same path 770 as the data traffic between pods belonging to the same subnet. Instead, data traffic between pods belonging to different subnets is routed by the gateway interface 332 or 732.

Rather than being transferred from the virtual Ethernet interface 362 associated with the source pod 320 directly to the tunnel interface 334, data traffic from pod 320 to pod 724 is directed to from the virtual Ethernet interface 362 to the gateway interface 332, which routes the data to the tunnel interface 334 of the OVS bridge 330 for encapsulation and forwarding toward the destination. The data traffic then follows a similar path as described above for FIG. 7, and is forwarded by the interface 355 of node 305 to the interface 755 of the node 705. The interface 755 sends the data to the tunnel interface 734 for decapsulation, and the decapsulated data is subsequently delivered to the pod 724 via its associated virtual Ethernet interface 764.

As mentioned above, data traffic between nodes traverses an intervening network fabric. In some embodiments, such as when the nodes are executing on the same computing device, the intervening network fabric includes a software switch executing on the computing device to connect different nodes on the computing device to each other and to a NIC of the computing device (i.e., for exchanging data between the nodes and elements external to the computing device).

Figure 9:
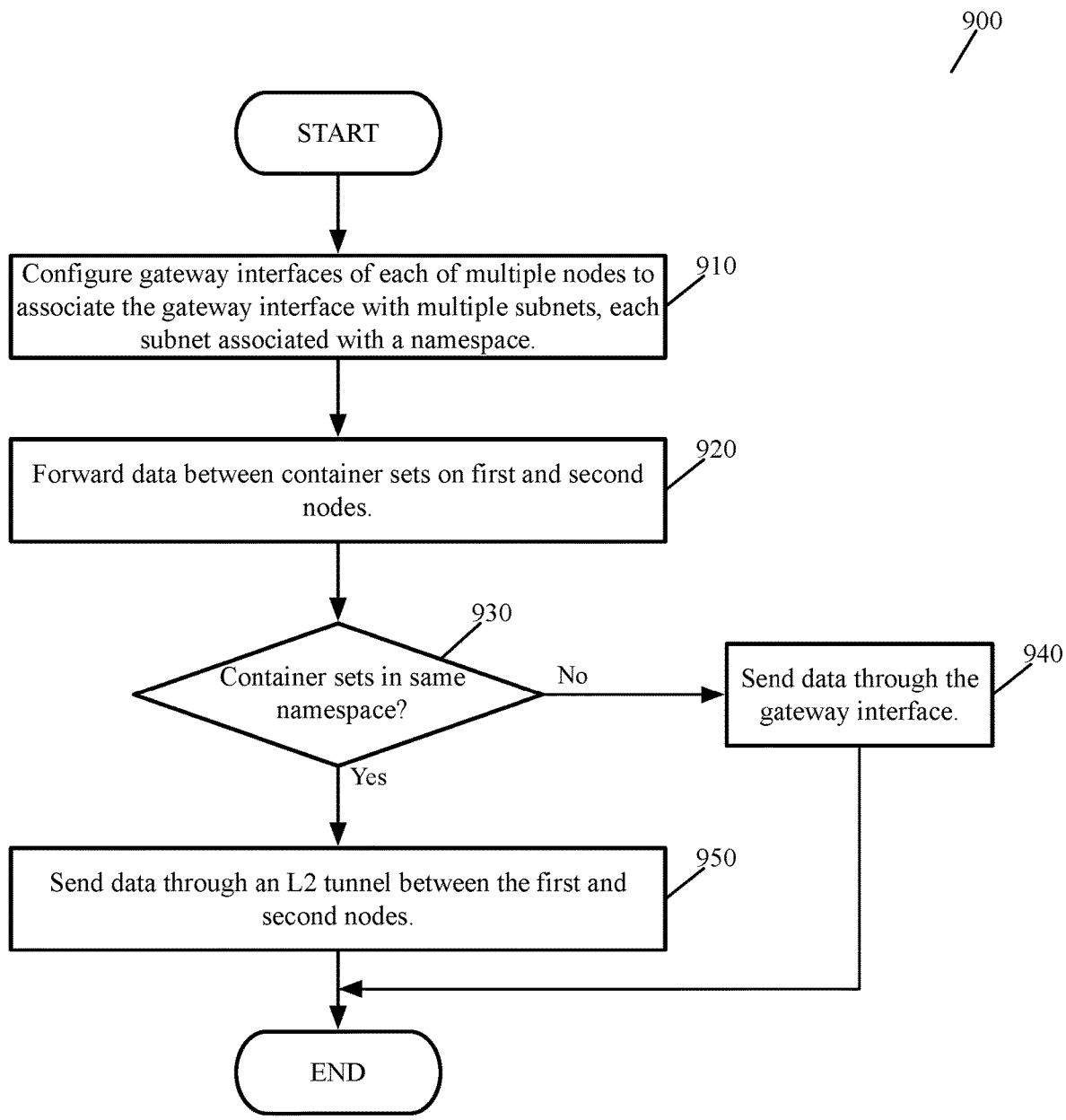
FIG. 9 conceptually illustrates a process of some embodiments for forwarding data between sets of containers on different worker nodes.

FIG. 9 conceptually illustrates a process of some embodiments for forwarding data between sets of containers on different worker nodes. The process 900 will be described with references to FIGS. 7-8. The process 900 starts by configuring (at 910) gateway interfaces of each of multiple nodes to associate the gateway interface with multiple subnets, each subnet associated with a namespace. The gateway interfaces 332 and 732 are illustrated as having two IP addresses 10.1.1.1/24 and 10.1.2.1/24, associated with two different subnets.

The process forwards (at 920) data between container sets on first and second nodes. As described above, data between pods that are executing on different nodes but that belong to the same subnet is forwarded along a path similar to the path 770, whereas data between pods that are executing on different nodes and belong to different subnets is forwarded along a path similar to the path 870.

The process determines (at 930) whether the container sets belong to the same namespace. In some embodiments, namespaces of the same subnet connect to a separate virtual switch in a LAN, whereas different subnets are routed by a virtual router. The gateway interfaces 332 and 732 are configured with multiple IP addresses such that the gateway interfaces no longer act as single node gateways, but rather as traffic interfaces serving multiple subnets. Additionally, pods belonging to the same subnet will receive IP addresses from an IP address pool allocated to their associated namespace, while pods belonging to different subnets will receive IP addresses from different IP address pools.

When the process determines (at 930) that the container sets do not belong to the same namespace, the process transitions to send (at 940) the data through the gateway interface. The pods 320 and 724, for instance, have assigned IP addresses 10.1.1.2/24 and 10.1.2.3/24, respectively, indicating these pods do not belong to the same subnet as their IP addresses were not assigned from the same IP address pool allocated to their respective namespaces. As a result, data from pod 320 is sent to pod 724 using the gateway interface 332. Following 940, the process 900 ends.

When the process determines (at 930) that the container sets do belong to the same namespace, the process transitions to send (at 950) the data through an L2 tunnel between the first and second nodes. The pods 320 and 720, for instance, have assigned IP addresses 10.1.1.2/24 and 10.1.1.4/24, respectively, indicating these pods belong to the same subnet as their IP addresses were assigned from the same IP address pool allocated to the namespace 310. As the pods belong to the same namespace, data between these pods can be forwarded at L2 by the tunnel interfaces 334 and 734 of the OVS bridges 330 and 730 through the overlay tunnel 780. Following 950, the process 900 ends.

Figure 10:
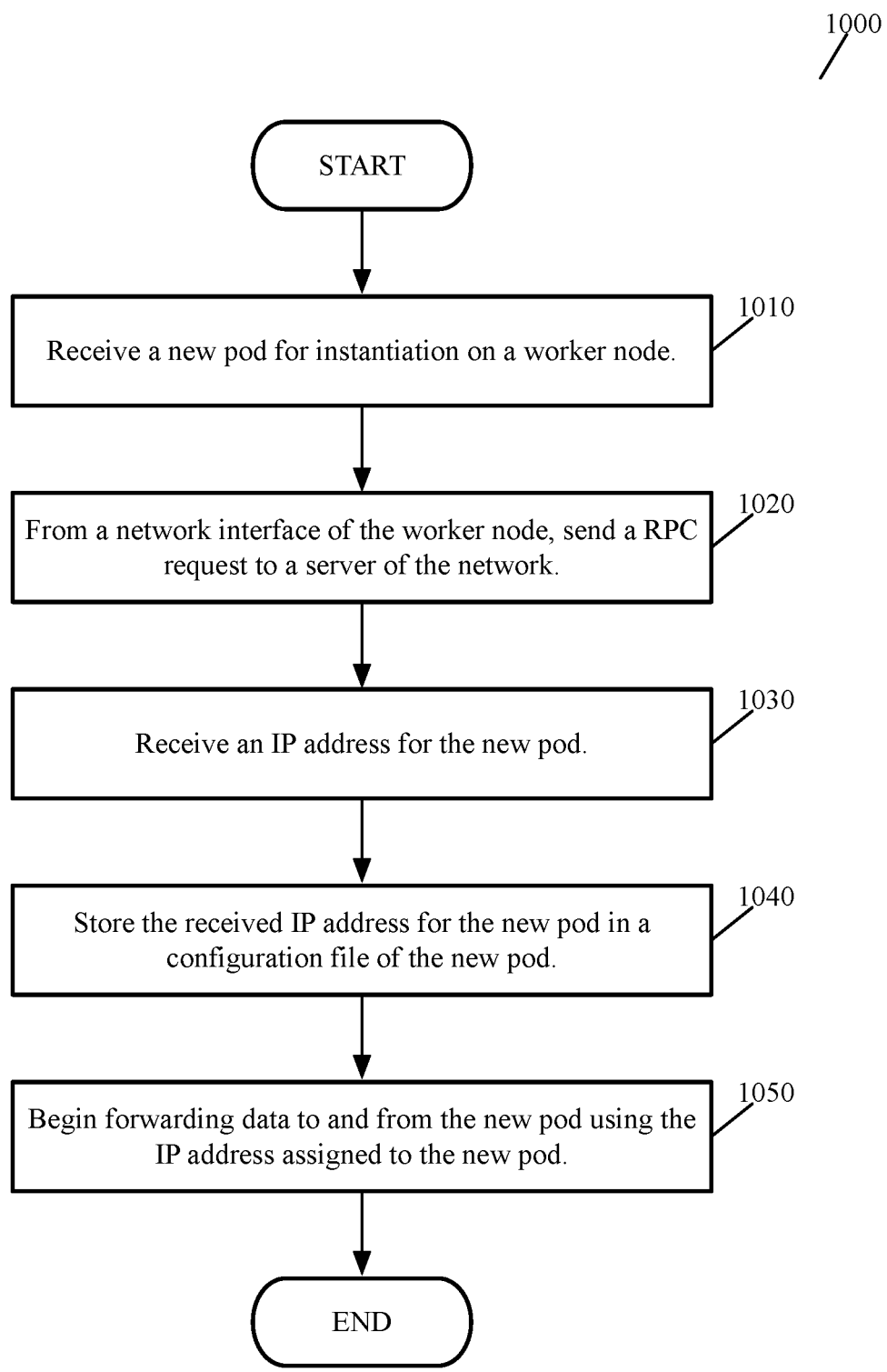
FIG. 10 conceptually illustrates a process performed in some embodiments when a new pod is instantiated on a worker node.

As described above, each pod is allocated an IP address from an IP address pool allocated to the namespace associated with the subnet to which the pod belongs. FIG. 10 conceptually illustrates a process performed in some embodiments when a new pod is instantiated on a worker node. The process 1000 starts by receiving (at 1010) a new pod for instantiation on a worker node. In some embodiments, the worker node executes a set of one or more existing pods, while in other embodiments, the new pod is a first pod to execute on the worker node.

From a network interface of the worker node, the process sends (at 1020) an RPC request to a server of the network. For instance, in the network solution 200 described above, the Antrea-CNI 212 requests IP addresses for pods 230 instantiated on the node 205, and interacts with the Antrea agent 222 to update the IP tables 216 with the assigned IP addresses. When a new pod is scheduled to a node (i.e., is to be instantiated on the node), the Antrea-CNI 212 sends an RPC request to an Antrea CNI server, which processes the request. An IPAM CNI is then called to apply or release an IP address, and forward the RPC request to an IPAM CNI server. After receiving the request, the IPAM CNI server interacts with the Kubernetes API Server 260 to obtain the corresponding CRD resource, calculates and returns the IP address, gateway, and routes. In some embodiments, once a new pod is detected by an IPAM Controller, the controller updates corresponding flow table rules, IP tables, and routing tables.

The process receives (at 1030) an IP address for the new pod. The IP address is received, in some embodiments, by the Antrea agent 222 that runs in a container on the daemonset 220 from the Kubernetes API server 260. The Antrea agent 222 then uses the received IP address to update the IP tables 216, which is used, in some embodiments, by the kube-proxy 214 to forward data traffic for pods 230 running on the node 205.

The process stores (at 1040) the received IP address for the new pod in a configuration file of the new pod. For example, the static IP address for a pod can be configured by the annotation field for the configuration file for the pod. In some embodiments, this allows for the pod to be migrated to a different node without losing the assigned IP address for the pod. The process then begins forwarding (at 1050) data to and from the new pod using the IP address assigned to the new pod. Following 1050, the process 1000 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
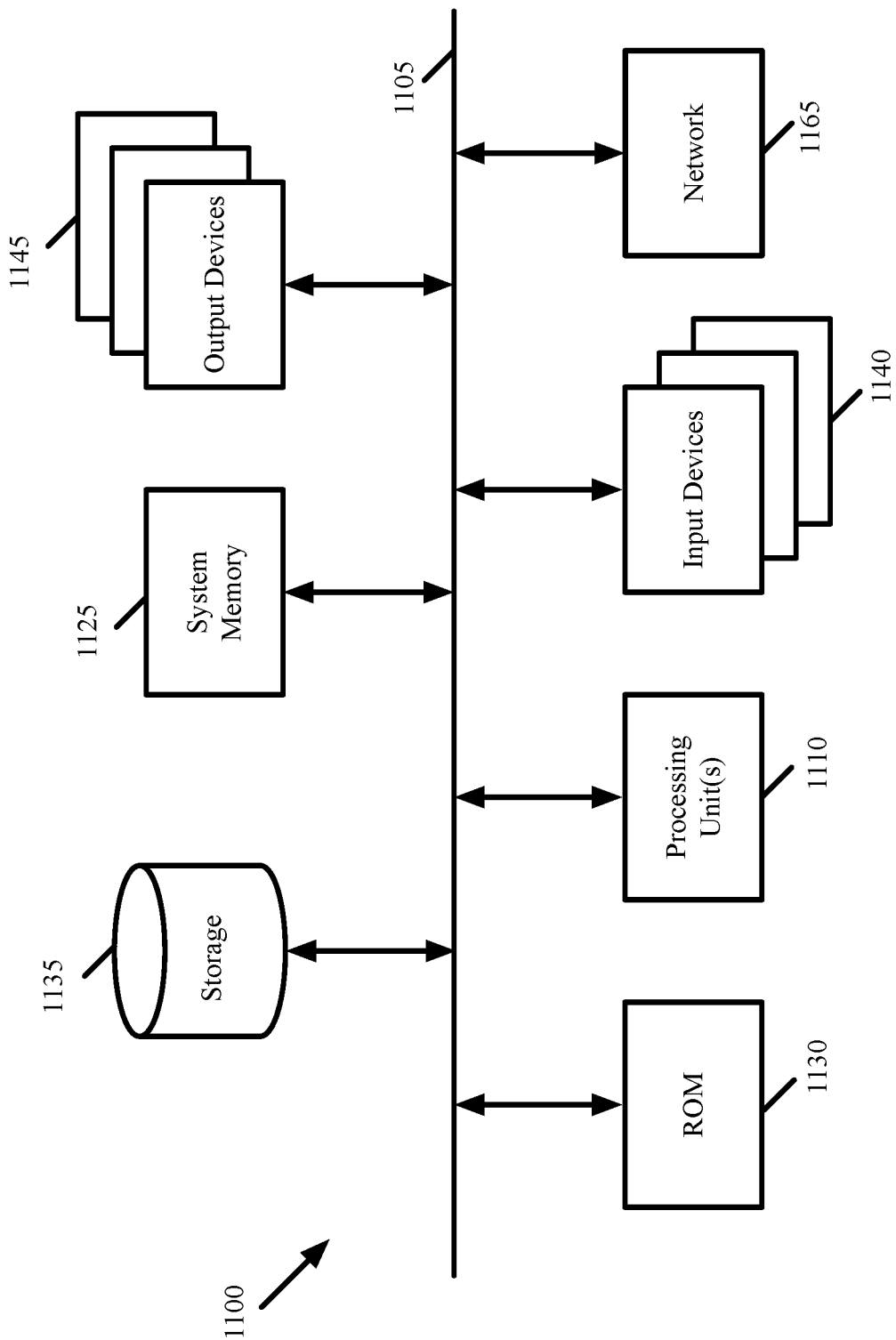
FIG. 11 conceptually illustrates a computer system with which some embodiments of the invention are implemented.

FIG. 11 conceptually illustrates a computer system 1100 with which some embodiments of the invention are implemented. The computer system 1100 can be used to implement any of the above-described hosts, controllers, gateway and edge forwarding elements. As such, it can be used to execute any of the above-described processes. This computer system 1100 includes various types of non-transitory machine-readable media and interfaces for various other types of machine-readable media. Computer system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the computer system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments. The read-only-memory (ROM) 1130 stores static data and instructions that are needed by the processing unit(s) 1110 and other modules of the computer system. The permanent storage device 1135, on the other hand, is a read-and-write memory device. This device is a non-volatile memory unit that stores instructions and data even when the computer system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device 1135. Like the permanent storage device 1135, the system memory 1125 is a read-and-write memory device. However, unlike storage device 1135, the system memory 1125 is a volatile read-and-write memory, such as random-access memory. The system memory 1125 stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices 1140 enable the user to communicate information and select commands to the computer system 1100. The input devices 1140 include alphanumeric keyboards and pointing devices (also called "cursor control devices"). The output devices 1145 display images generated by the computer system 1100. The output devices 1145 include printers and display devices, such as cathode ray tubes (CRT) or liquid crystal displays (LCD). Some embodiments include devices such as touchscreens that function as both input and output devices 1140 and 1145.

Finally, as shown in FIG. 11, bus 1105 also couples computer system 1100 to a network 1165 through a network adapter (not shown). In this manner, the computer 1100 can be a part of a network of computers (such as a local area network ("LAN"), a wide area network ("WAN"), or an Intranet), or a network of networks (such as the Internet). Any or all components of computer system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of sending data in a network comprising a plurality of worker nodes, each worker node executing at least one set of containers, a gateway interface, and a virtual local area network (VLAN) tunnel interface, the method comprising:

configuring the gateway interface of each worker node to associate the gateway interface with a plurality of subnets, wherein (i) each subnet is associated with a namespace, (ii) a first worker node executes a first set of containers of a first namespace, and (iii) a second worker node executes a second set of containers of the first namespace and a third set of containers of a second namespace;

sending data between the first set of containers and the second set of containers through a VLAN tunnel between the first and second worker nodes; and sending data between the first set of containers and the third set of containers through the gateway interface;

assigning a static IP address to the first set of containers by storing the static IP address in a configuration file of the first set of containers; and migrating the first set of containers from the first worker node to the second worker node while maintaining the static IP address of the set of contain.

2. The method of claim 1, wherein sending data between the first set of containers and the third set of containers through the gateway comprises sending the data from the gateway of the first worker node through the VLAN interface of the first worker node and through the VLAN interface of the second worker node.

3. The method of claim 1, wherein sending data between the first and second sets of containers through the VLAN tunnel comprises (i) performing layer 2 (L2) lookups to reach the VLAN interfaces of the first and second worker nodes and (ii) encapsulating the data at the VLAN interfaces of the first and second worker nodes.

4. The method of claim 3, wherein encapsulating data at the VLAN interfaces comprises encapsulating the data with a Geneve tunnel header.

5. The method of claim 1, wherein the VLAN tunnel interface and the gateway interface are interfaces of a virtual switch.

6. The method of claim 5, wherein the virtual switch further comprises a virtual Ethernet interface associated with each set of containers.

7. The method of claim 6 further comprising sending data between the second set of containers and the third set of containers through the virtual Ethernet interface associated with the second set of containers, the gateway of the second worker node, and the virtual Ethernet interface associated with third set of containers.

8. The method of claim 7, wherein the second worker node further executes a fourth set of containers of the first namespace, the method further comprising sending data between the second set of containers and the fourth set of containers through the virtual Ethernet interface associated with the second set of containers and the virtual Ethernet interface associated with third set of containers, but not the gateway of the second worker node.

9. The method of claim 1, wherein the first set of containers execute within a first pod of the first namespace on the first worker node, the second set of containers execute within a second pod of the first namespace on the second worker node, and the third set of containers execute within a third pod of the second namespace on the second worker node.

10. The method of claim 1, wherein each namespace is assigned a set of IP addresses.

11. The method of claim 10, wherein:
the first namespace is assigned a first set of IP address;
the second namespace is assigned a second set of IP addresses; and
the first set of IP addresses has a different number of IP addresses than the second set of IP addresses.

12. The method of claim 10, wherein a fourth set of containers of the first namespace is instantiated on the first worker node, the method further comprising:
sending, from a network interface of the first worker node, a remote procedure call (RPC) request to a server of the network; and in response to the RPC, receiving an IP address for the fourth set of containers from the first set of IP addresses assigned to the first namespace.

13. The method of claim 12, wherein the received IP address is assigned to the fourth set of containers by an IP address management interface of the first worker node.

14. The method of claim 1, wherein the network is an Antrea Kubernetes network.

15. A non-transitory machine readable medium storing a program for execution by a set of processing units, the program for sending data in a network comprising a plurality of worker nodes, each worker node executing at least one set of containers, a gateway interface, and a virtual local area network (VLAN) tunnel interface, the program comprising sets of instructions for:
configuring the gateway interface of each worker node to associate the gateway interface with a plurality of subnets, wherein (i) each subnet is associated with a namespace, (ii) a first worker node executes a first set of containers of a first namespace, and (iii) a second worker node executes a second set of containers of the first namespace and a third set of containers of a second namespace;
sending data between the first set of containers and the second set of containers through a VLAN tunnel between the first and second worker nodes; and
sending data between the first set of containers and the third set of containers through the gateway interface;
assigning a static IP address to the first set of containers by storing the static IP address in a configuration file of the first set of containers; and
migrating the first set of containers from the first worker node to the second worker node while maintaining the static IP address of the set of contain.

16. The non-transitory machine readable medium of claim 15, wherein the set of instructions for sending data between the first set of containers and the third set of containers through the gateway comprises a set of instructions for sending the data from the gateway of the first worker node through the VLAN interface of the first worker node and through the VLAN interface of the second worker node.

17. The non-transitory machine readable medium of claim 15, wherein:
the VLAN tunnel interface and the gateway interface are interfaces of a virtual switch that further comprises a virtual Ethernet interface associated with each set of containers; and
the program further comprises a set of instructions for sending data between the second set of containers and the third set of containers through the virtual Ethernet interface associated with the second set of containers, the gateway of the second worker node, and the virtual Ethernet interface associated with third set of containers.

18. The non-transitory machine readable medium of claim 15,
wherein: each namespace is assigned a set of IP addresses, the first namespace is assigned a first set of IP addresses; the second namespace is assigned a second set of IP addresses; and
the first set of IP addresses has a different number of IP addresses than the second set of IP addresses.

\* \* \* \* \*